(12) United States Patent
Bailey et al.

(10) Patent No.: US 10,705,868 B2
(45) Date of Patent: *Jul. 7, 2020

(54) DYNAMICALLY CONFIGURABLE MICROSERVICE MODEL FOR DATA ANALYSIS USING SENSORS

(71) Applicant: ModelOp, Inc., Chicago, IL (US)

(72) Inventors: Stuart Bailey, San Jose, CA (US); Matthew Mahowald, Chicago, IL (US); Maksym Kharchenko, Kyiv (UA)

(73) Assignee: ModelOp, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/721,319

(22) Filed: Sep. 29, 2017

(65) Prior Publication Data

US 2019/0042290 A1 Feb. 7, 2019

Related U.S. Application Data

(60) Provisional application No. 62/542,218, filed on Aug. 7, 2017.

(51) Int. Cl.
| | | |
|---|---|---|
| *G06F 9/455* | (2018.01) | |
| *G06F 8/51* | (2018.01) | |
| *G06F 8/60* | (2018.01) | |
| *G06N 20/20* | (2019.01) | |
| *G06N 5/00* | (2006.01) | |
| *G06Q 10/06* | (2012.01) | |
| *G06F 8/30* | (2018.01) | |
| *G06N 20/00* | (2019.01) | |

(52) U.S. Cl.
CPC ............ *G06F 9/45558* (2013.01); *G06F 8/31* (2013.01); *G06F 8/51* (2013.01); *G06F 8/60* (2013.01); *G06F 9/455* (2013.01); *G06F 9/45504* (2013.01); *G06N 5/003* (2013.01); *G06N 20/00* (2019.01); *G06N 20/20* (2019.01); *G06F 8/30* (2013.01); *G06Q 10/067* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | |
|---|---|---|---|
| 9,400,889 B2 * | 7/2016 | Chess ...................... | G06F 9/44 |
| 9,667,725 B1 | 5/2017 | Khanduja | |

(Continued)

FOREIGN PATENT DOCUMENTS

WO    WO-2017025203 A1 *   2/2017   ............. G06F 9/485

OTHER PUBLICATIONS

Almeida et al., "Hydra: An Ubiquitous Application for Service Rerouting," 2012 9th International Conference on Ubiquitous u Intelligence and Computing and 9th International Conference on Autonomic and Trusted Computing, Fukuoka, 2012, pp. 366-373 (Year: 2012).

*Primary Examiner* — James D. Rutten
(74) *Attorney, Agent, or Firm* — Van Pelt, Yi & James LLP

(57) ABSTRACT

A virtualized execution environment is generated for an analytic engine that includes executable code to implement an analytic model for processing an input data stream. At an interface a configuration for the analytic model is received. The virtualized execution environment is dynamically configured for the analytic engine at runtime based on the configuration for the analytic model.

21 Claims, 22 Drawing Sheets

(56) References Cited

U.S. PATENT DOCUMENTS

| | | | |
|---|---|---|---|
| 2002/0062475 A1* | 5/2002 | Iborra | G06F 8/30 |
| | | | 717/108 |
| 2003/0163603 A1* | 8/2003 | Fry | G06F 8/427 |
| | | | 719/328 |
| 2012/0304172 A1* | 11/2012 | Greifeneder | G06F 9/45504 |
| | | | 718/1 |
| 2014/0278337 A1* | 9/2014 | Branson | G06F 11/3457 |
| | | | 703/22 |
| 2016/0048388 A1* | 2/2016 | Eksten | G06F 8/70 |
| | | | 717/105 |
| 2016/0182315 A1 | 6/2016 | Salokanto | |
| 2016/0292598 A1* | 10/2016 | Kumar | G06Q 10/067 |
| 2017/0111236 A1 | 4/2017 | Bielenberg | |
| 2018/0121221 A1* | 5/2018 | Ahuja | G06F 9/45558 |
| 2018/0157517 A1 | 6/2018 | Dong | |

* cited by examiner

US 10,705,868 B2

DYNAMICALLY CONFIGURABLE MICROSERVICE MODEL FOR DATA ANALYSIS USING SENSORS

CROSS REFERENCE TO OTHER APPLICATIONS

This application claims priority to U.S. Provisional Patent Application No. 62/542,218 entitled MODEL EXECUTION ENGINE WITH INSTRUMENTATION FOR GRANULAR PERFORMANCE ANALYSIS FOR METRICS AND DIAGNOSTICS FOR TROUBLESHOOTING filed Aug. 7, 2017 which is incorporated herein by reference for all purposes.

BACKGROUND OF THE INVENTION

The use of data and analytics is becoming increasingly important for technical enterprises to widen competitive advantages in terms of scientific research and development, engineering efficiencies, and performance improvements. Efficiently implementing and leveraging such data and analytics is still a technical challenge for companies.

BRIEF DESCRIPTION OF THE DRAWINGS

Various embodiments of the invention are disclosed in the following detailed description and the accompanying drawings.

DETAILED DESCRIPTION

Figure 1:
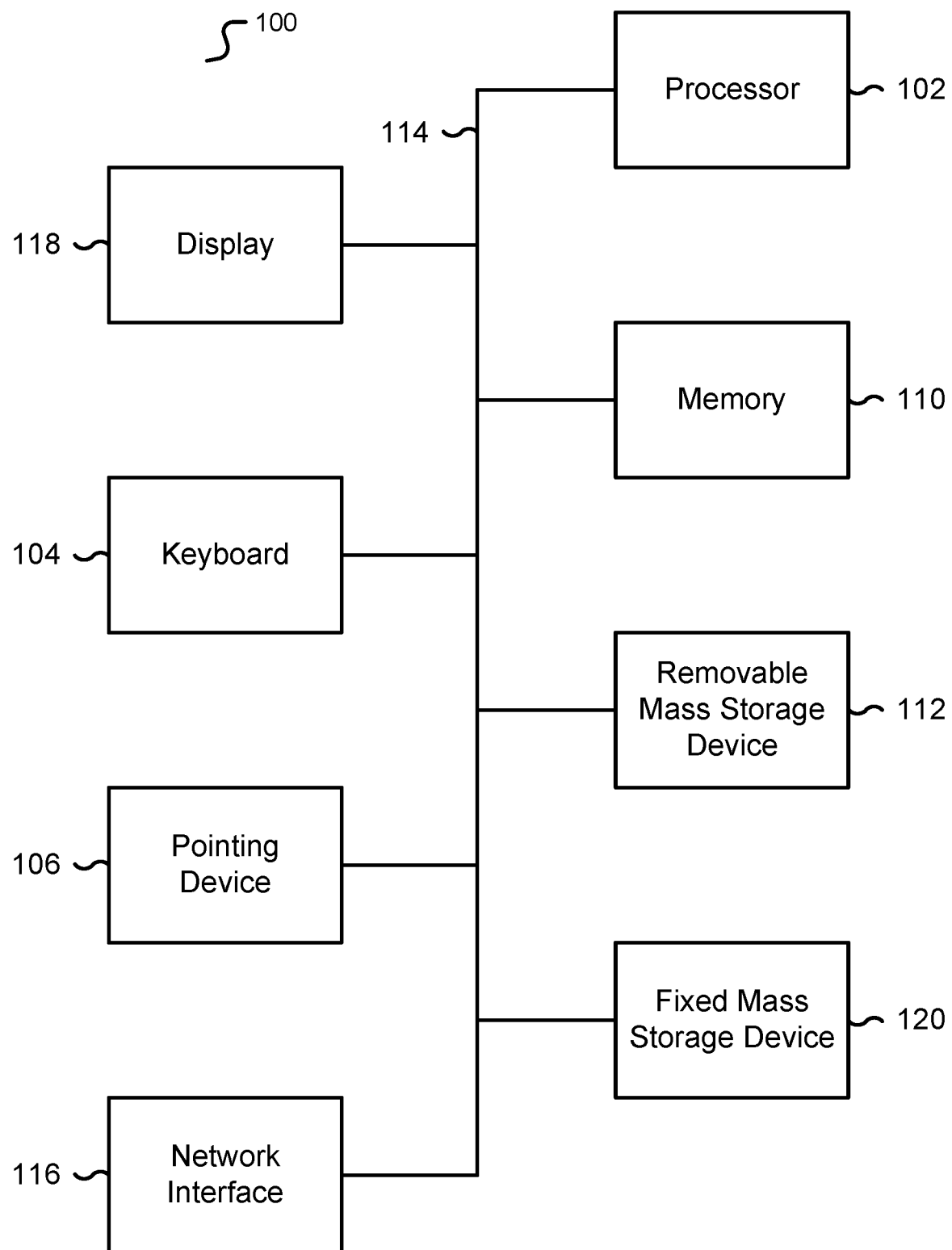
FIG. 1 is a functional diagram illustrating a programmed computer/server system for an analytic model engine in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An analytic model execution engine with instrumentation for granular performance analysis for metrics and diagnostics for troubleshooting is disclosed. For scientific research, engineering, data mining, applied mathematical research, and/or analytics, once an analytical and/or computational model is developed for one platform, it is hard to rewrite and port into other platforms. Furthermore, it would be useful to be able to take advantage of different data streams to input into the model and to monitor performance of the model on a computer system. The disclosed engine addresses these issues as well as various other technical challenges for efficiently implementing and leveraging such data and analytics for enterprises as further described below.

Abstraction of an analytic model from its operational execution environment is disclosed. A virtualized execution environment (VEE) is used to abstract the analytic model. In one embodiment, operating system-level virtualization such as a container is used for the VEE and represents an example used throughout this specification, but without limitation other virtualization levels may also be used for abstraction, including: a hardware-level virtualization such as a virtual machine (VM), application-level virtualization, workspace-level virtualization, and/or service virtualization. Container environments used may include Docker and/or LxC.

The designer of an analytic model, referred to herein as a "data science user", uses one of a number of programming languages/tools including, for example, C, Python, Java, R, S, SAS ("Statistical Analysis System"), PFA ("Portable Format for Analytics"), H2O, PMML ("Predictive Model Markup Language"), SPSS, and MATLAB to articulate their analytic model that may use libraries/packages such as NumPy for scientific and numeric computing, BLAST for bioinformatics, and/or TensorFlow for machine learning. Given its programming language, the data science user incorporates design rules into the analytic model to permit abstraction of their model in a disclosed execution framework. The design rules also include specifying a schema for each input and output to the model.

The analytic model consumes data, typically in the form of a stream. The provider of analytic data, referred to herein as a "devops user", uses one or more data sources including, for example, Apache Spark, Hadoop, Amazon Redshift, Azure SQL Data Warehouse, Microsoft SQL Server, and/or Teradata. The devops user also uses one or more example infrastructure systems including: on-premises hardware such as in-office computing and/or proprietary datacenter computing; and off-premises hardware such as cloud infrastructure including AWS ("Amazon Web Services), Microsoft Azure, IBM BlueMix, and/or GCP ("Google Cloud Platform"). The devops user provides an I/O descriptor for each stream to permit abstraction of the I/O stream in the disclosed execution framework. Without limitation the data science user may be the same user as the devops user.

The analytic model abstraction and I/O descriptor abstraction are used in the design of a standardized container referred to herein as an "engine" to permit analytic models to be deployed/operationalized with their associated streams. In one embodiment, a containerized design approach is used for the engine container and its associated support containers such as a model connector, model manager, and dashboard with each container providing a web service using an API, for example a RESTful API, to provide independently executable microservices. The approach provides a clean abstraction to the analytic design process and a clean abstraction to the data engineering and feeds. The container abstraction itself shares the advantages of containerized environments such as the Docker ecosystem, scaling, cloud ecosystems, and flexibility using RESTful APIs.

These abstractions divide and conquer analytics organizations to provide a novel type of user, referred to herein as an "analytic ops" specialist and/or user, with the ability to deploy/operationalize an analytic model independent of the language of articulation, the data/streams on which it executes over, and the systems on which it runs. Data science users and quants focus on algorithm and model design with systems to explore and create algorithms until they have a model conforming to design rules for a model abstraction. Devops users such as dataops, data engineering, and/or IT specialization focus on establishing and maintaining feeds, operational data, and/or historical data streams for a stream abstraction. Devops users also build and/or maintain the on-premises and off-premises/cloud infrastructure for a container abstraction. Thus, the disclosed techniques allow the analytic ops user to be free to focus on tuning and deployment of any analytic model with true language neutrality under any infrastructure and with any data stream with true data neutrality, without requiring a deep understanding of data science, production data, and/or infrastructure.

This container, model, and stream abstraction approach addresses predictive analytics deployment challenges:
 a. IT teams find it challenging to manually recode analytic models;
 b. Complex, for example machine learning, analytic models are hard to deploy;
 c. Updating production analytic models is too slow of a process;
 d. It is challenging to support many analytic model languages, for example SAS, R, and Python;
 e. Data Science and IT teams find it challenging to work together as they belong to different disciplines with different backgrounds, strengths, weaknesses, and/or perspectives; and
 f. It is hard to scale scoring across enterprise data.

A dynamically configurable microservice model for data analysis using sensors is also disclosed. Data analytics often uses high performance profiling/tuning to provide efficient processing of data. Sensors are a programming object used to provide profiling for the analytic model and/or streams, and may be associated with metrics/tools for monitoring, testing, statistically analyzing and/or debugging. A sensor may include: a code point related to the engine structure such as a model runner, input port, or output port; a sampling frequency; and/or a reporting frequency. Using an API such as a RESTful API a sensor may be added at run-time, dynamically configured at run-time, and/or removed at run-time. Dynamic configuration of a sensor includes reconfiguration a sensor parameter and/or threshold.

The engine and any container and/or VEE may be dynamically configured at run-time using an interface such as a RESTful API. Dynamic configuration of an engine includes changing a stream, an analytic model, an included library, and/or a cloud execution environment. The RESTful API may be used directly, via an SDK, via a CLI ("command line interface"), and/or via a GUI ("graphical user interface") such as a dashboard.

Applications for a dynamically configurable microservice analytic model include, for example, being able to run-time compare different stream sources, different streams, different languages for a given analytic model, and different analytic models in a champion/challenger style. Applications for dynamically configurable sensors include run-time debugging and/or run-time profiling until the engine is optimized, followed by run-time optimization by dynamically removing sensors for increased performance.

A deployment and management platform for model execution engine containers is also disclosed. As described above, many use cases for data science include a plurality of analytic model environments. Two or more model environments may be modularized with an engine for each model environment. The disclosed platform includes platform containers, such as: a model manager container for storing each model/engine; a connect container to provide discovery services for each model/engine; and a fleet controller to provide deployment services for each model/engine.

One application for a deployment and management platform includes deploying a "pipeline", or a series of two or more engines wherein streams from the output of one engine are coupled to the input of another engine. As each VEE/container is self-contained, a pipeline may employ a cloud complex analytic workflow that is cloud portable, multi-cloud, inter-cloud, hybrid cloud, system portable, and/or language neutral. For example, if it is determined using sensors after a first deployment that a third engine within a pipeline of five engines placed in a Microsoft Azure cloud infrastructure is lagging in performance, the pipeline's third engine may be dynamically moved at run-time to a Google GCP cloud infrastructure such that the remaining engines remain in Microsoft Azure.

Another application for the platform is dynamic scaling of an engine based on a concurrency model and feedback from a sensor and/or user, wherein the platform may dynamically at run-time spin up/instantiate additional containers for the analytic engine to be executed in parallel, and dynamically couple the appropriate I/O streams at run-time, whether a stream is training data or live data.

FIG. 1 is a functional diagram illustrating a programmed computer/server system for an analytic model engine in accordance with some embodiments. As shown, FIG. 1 provides a functional diagram of a general purpose computer system programmed to provide an analytic model engine in accordance with some embodiments. As will be apparent, other computer system architectures and configurations can be used for an analytic model engine.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio recording device, audio card, speakers, a touch (or pointing) device, and/or other subsystems as needed. Besides a touch screen and/or capacitive touch interface, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems may also be utilized.

Figure 2A:
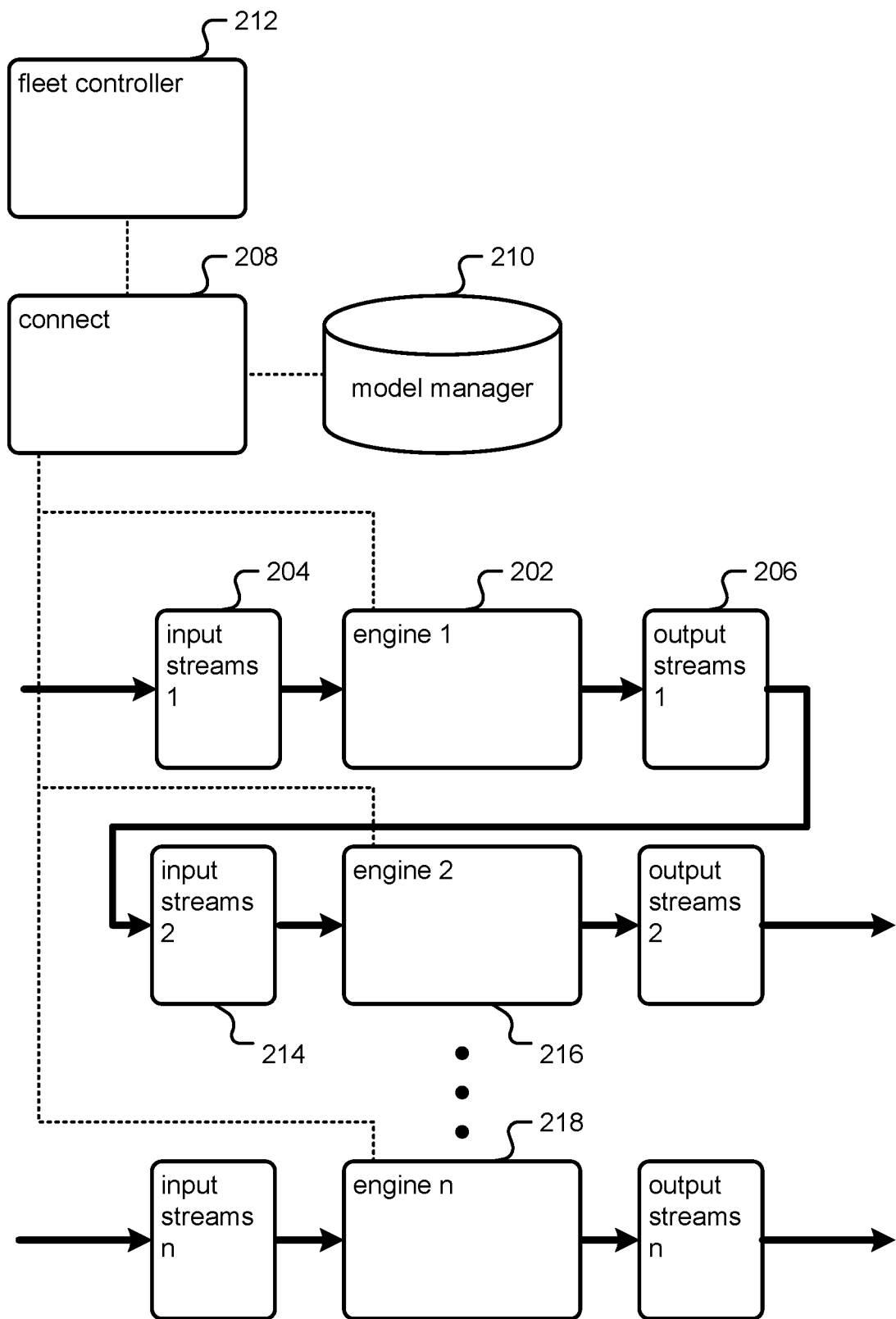
FIG. 2A is a block diagram illustrating an embodiment of an analytic model engine system.

FIG. 2A is a block diagram illustrating an embodiment of an analytic model engine system. Some of the blocks shown in FIG. 2A are virtualized execution environments, for example Docker containers, hosted by one or more computer/server systems in FIG. 1 on premises or in a cloud infrastructure. In one embodiment, an engine (202) is a container comprising an analytic model and providing a portable and independently executable microservice, for example via a web service with RESTful API. The engine (202) is coupled to an input stream (204) for data input and an output stream (206) for data output including scoring the analytic model based on the data input.

The engine (202) is coupled to a connect container (208), which provides discovery service for the engine (202) and other containers, for example to establish a system of determining the IP address of the engine (202) for contact via the RESTful API. The connect container (208) is coupled to a model manager database (210) to store abstractions as static descriptions comprising: models, schemas, I/O descriptors, sensors, model environment abstractions, engine environment abstractions, and/or model I/O tests. These descriptions are referred to herein as "static" in the sense that they are a configuration bound to a file prior to or during run-time. The connect container (208) is also coupled to a fleet controller container (212) that binds a description in the model manager (210) to run-time abstractions in the engines (202) and orchestrates communication between users and engines and between engines, for example via an SDK ("software development kit"), a CLI, and/or a dashboard GUI.

Utilizing the fleet controller (212), model manager (210) and/or connect (208) containers, a pipeline of engines may be established, here shown to connect the output stream of the engine (206) to an input stream (214) of a second engine (216). Within the system of FIG. 2A as many engines may be statically designed or dynamically spun up, and given the interoperable and ubiquity of containers, for example Docker containers, in cloud computing virtually an unlimited number of engines may be used, here shown up to an nth engine (218).

Figure 2B:
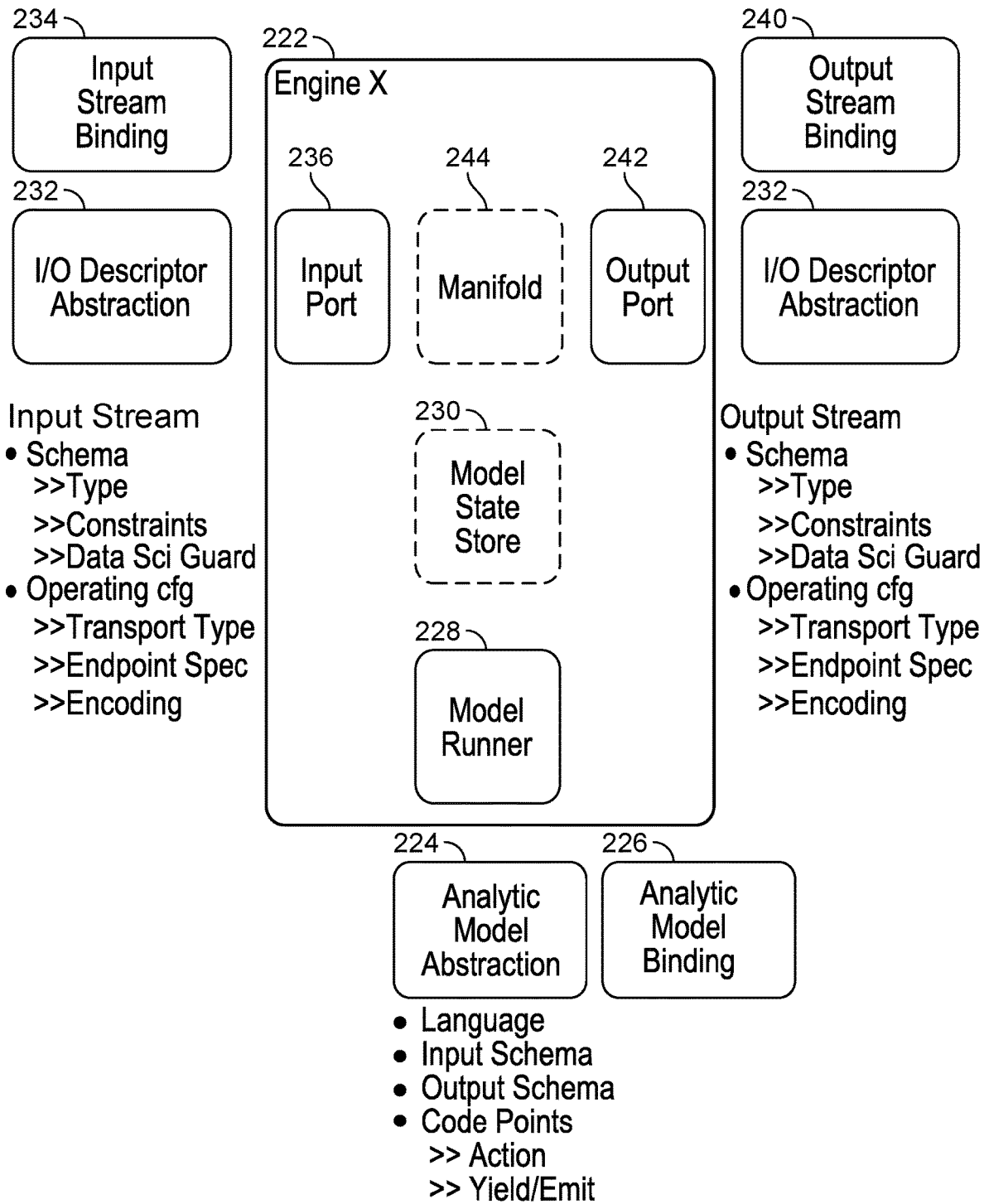
FIG. 2B is a block diagram illustrating an embodiment of an analytic model engine.

FIG. 2B is a block diagram illustrating an embodiment of an analytic model engine. In one embodiment, the system of FIG. 2B is represented by engines (202), (216), (218) in FIG. 2A. In one embodiment, the engine is a Docker container, but without limitation any other VEE may be used, for example a VMW are virtual machine.

Engine (222) is associated with an analytic model. An analytic model abstraction (224) is used to abstract a given analytic model, comprising:

a. The model's programming language, for example, Java, Python, C, or R;
b. One or more input schema for the model, wherein the input schema comprises: one or more data types, constraints, and data science guards. In one embodiment, a schema is language neutral and may be expressed in a declarative language and/or execution neutral language such as JSON, XML, and/or Avro. This schema may include a specification for: a data type such as integer, float, and/or Boolean; constraints such as non-negative values and/or positive values; and data science guards such as a specification of a probability distribution and/or a standard deviation with tolerances.
c. One or more output schema for the model, wherein the output schema comprises: one or more data types, constraints, and data science guards; and
d. Language specific execution code points, wherein the code points at a minimum comprise: an action to start scoring and/or computing; and a yield/emit to start outputting score results. This includes specifying an appropriate/language-specific code point for execution referred to herein as an "action". Examples of an action include the main( ) loop in C, the code between the keyword action and keywords yield/emit in R, and so forth.

For the given analytic model (226) bound to the abstraction (224), allocation is made within the container (222) for a model runner (228) responsible for providing an execution environment for the language specified by the model (226) in its abstraction (224) and/or an inspection of the model (226). For example, if the language is C, the model runner (228) may include appropriate C libraries and dependencies for code execution, and if the language is Python, the model runner (228) may include the Python 2 or Python 3 interpreter with the appropriate Python packages. Allocation is also made for model state store (230) within container (222) based on inspection of the model (226).

Engine (222) is associated with one or more input streams. An I/O descriptor abstraction (232) is used to abstract a given input stream, comprising:

a. A schema, comprising: one or more data types, constraints, and data science guards; and
b. An operating configuration, comprising: a transport type, one or more endpoint specifics, and an encoding. One example would be a transport type of a file in a filesystem, an endpoint specific being a file descriptor, and an encoding being JSON. Another example would be a transport type of a Kafka stream, an endpoint specific being a Kafka bootstrap server configuration, and an encoding being AVRO binary.

The abstraction (232) is bound to an input stream (234) and coupled to an appropriate input port (236) in the engine (222). Likewise an output is associated with another I/O descriptor abstraction (232), bound to an output stream (240), and coupled to an appropriate output port (242) in the engine (222). One or more internal/hidden blocks such as a manifold (244) may provide services comprising:

a. a schema checker to compare the input schema from the analytic model abstraction (224) which may be provided by a data science user with the input I/O descriptor abstraction (232) which may be provided by a devops user; and b. serializiation and deserialization and/or encode/unencode a stream (234), (240), for example to deserialize for a Python object.

In this embodiment, the engine (222) has two primary functions: first, it binds an analytic model (226) to an abstraction (224) and streams (234),(240) to an I/O descriptor abstraction (232) using a consistency check on the appropriate input and output schemas in any order of binding; second, it executes the model by invoking the model runner (228).

Figure 2C:
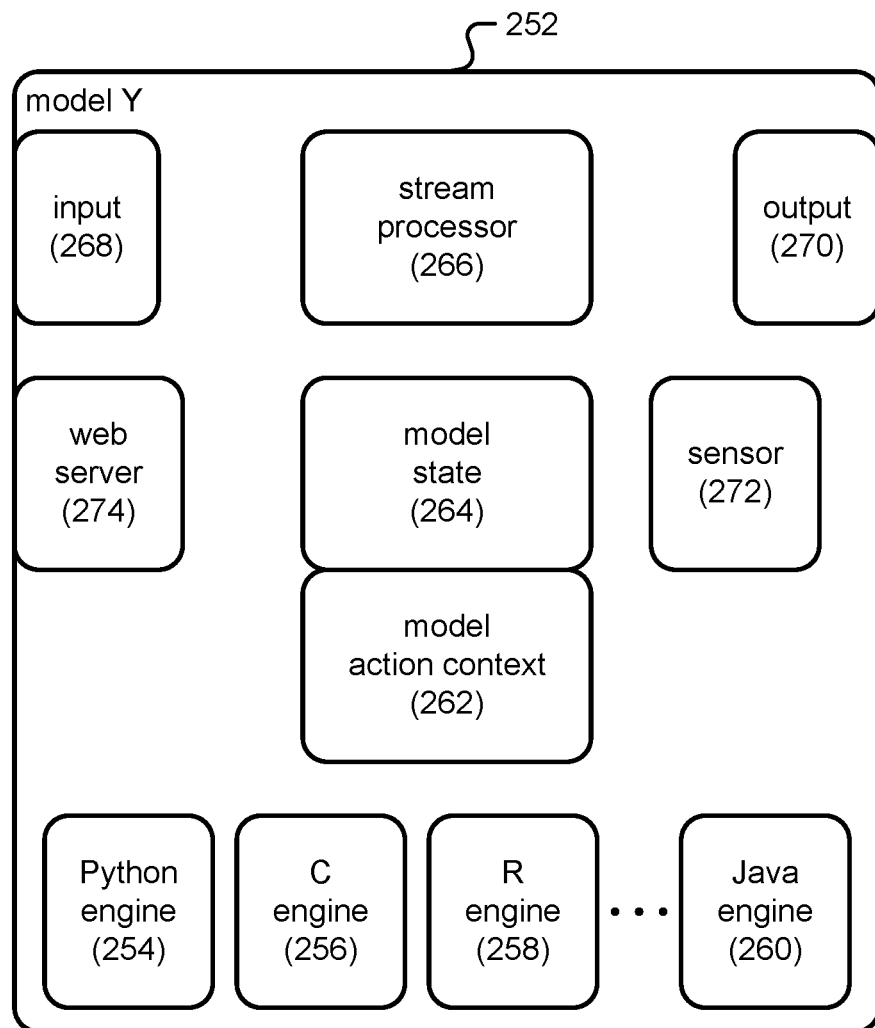
FIG. 2C is a block diagram illustrating an embodiment of an analytic model binding.

FIG. 2C is a block diagram illustrating an embodiment of an analytic model binding. In one embodiment, the system of FIG. 2C is represented by model binding (226) in FIG. 2B and execution is served by model runner (228) in FIG. 2B. After the data science follows the design rules in crafting the analytic model algorithm in a specific programming language and binds it to abstraction (224), the system interprets the code, inspecting the model code for code snippets that are associated with, for example: action, emit/yield, whether state is saved externally, concurrency flags, and whether state is shared. After the model execution framework is interpreted and/or inspected, the system generates a VEE such as a Docker container for the analytic engine (222) to include executable code (252) to implement the analytic model as shown in FIG. 2C.

Language specific engines comprising compilers/interpreters, toolchains, debuggers, profilers, development environments, libraries and/or dependencies are instantiated to permit a flexible selection of programming languages including Python (254), C (256), R (258), and Java (260), and an ellipses is used in FIG. 2C to indicate there may be other languages not shown in FIG. 2C such as PFA, MATLAB, and SAS.

In FIG. 2C the analytic model code itself to be executed is referred to herein as the model action context (262) and an associated model state (264) is used consistent with the above inspection/interpretation of state initialization and state management. Stream processor (266) is a component that may perform serialization and deserialization of input data (268) and output data (270). Stream processor (266) may comprise drivers for different data sources and for different output destinations. Stream processor (266) may provide data type safety mechanisms like a computer science guard to enforce/flag data typing such as integers, constraints. Stream processor (266) may provide data science guards to enforce/flag statistical properties such as standard deviation.

The model (252) may include one or more sensors (272), components that debug and/or profile the model. A sensor may allow a user to instrument, for example, how much memory is being used in the action context (262), how much memory is being used in the stream processor (266), how many CPU cycles are being used by math in the action context (262), how many CPU cycles are being used serializing a data stream (266), how many CPU cycles are being used deserializing a data stream (266), and so on. For example, a sensor may facilitate continuous tuning. A sensor may be dynamically configurable such that they may be added, activated, reconfigured, deactivated, and/or removed at run-time via an API, for example an RESTful API.

An example of a sensor (272) for engine instrumentation comprises a description of: what to measure; sampling intervals; and output intervals, for example:

```
{
  "Tap": "sys.memory",
  "Activate": {
    "Type": "regular",
    "Interval": 0.5
  },
  "Report": {
    "Interval": 3.0
  }
}
```

The model (252) may include a web server (274), providing microservices over HTTP via an API, for example a RESTful API. The system in FIG. 2A, FIG. 2B, and FIG. 2C may in one embodiment have a standard API and/or RESTful API to allow a consistent programmatic approach to interfacing with various components in the system.

Figure 2D:
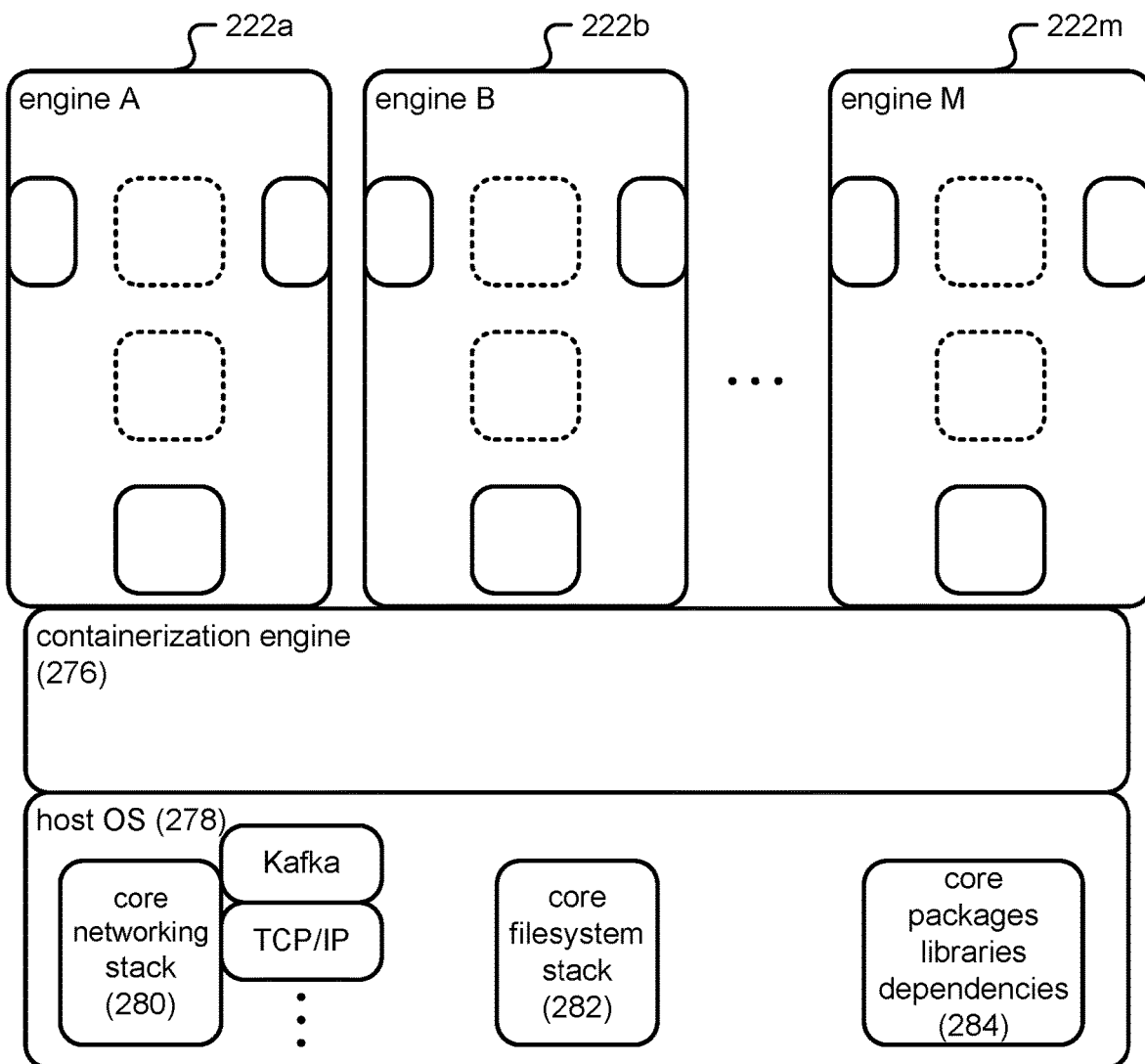
FIG. 2D is a block diagram illustrating an embodiment of an analytic model engine infrastructure representation.

FIG. 2D is a block diagram illustrating an embodiment of an analytic model engine infrastructure representation. In one embodiment, the engine (222) of FIG. 2B are represented in plurality in FIG. 2D by engine A (222a), engine B (222b), and to any number M for engine M (222m).

In various embodiments and without limitation, a VEE used for an engine (222) is a Docker and/or Linux LxC container. A containerized engine (276) is used to provide the operating-system level virtualization of each container. Containerized engine (276) may include other container services such as container deployment, scaling, clustering, and management, for example via Kubernetes, Mesos, and/or Docker Swarm.

In the case of a virtualized operating-system paradigm, the host OS (278) of on-premises hardware and/or off-premises cloud resources may include core stacks and dependencies available across all engines and management containers. This may include a core networking stack (280) with universal protocols such as TCP/IP and/or internal protocols used for the system such as Kafka. Similarly, a core filesystem stack (282) may be used and other core packages, libraries, and/or dependencies (284) may be installed in the host OS (278).

Figure 2E:
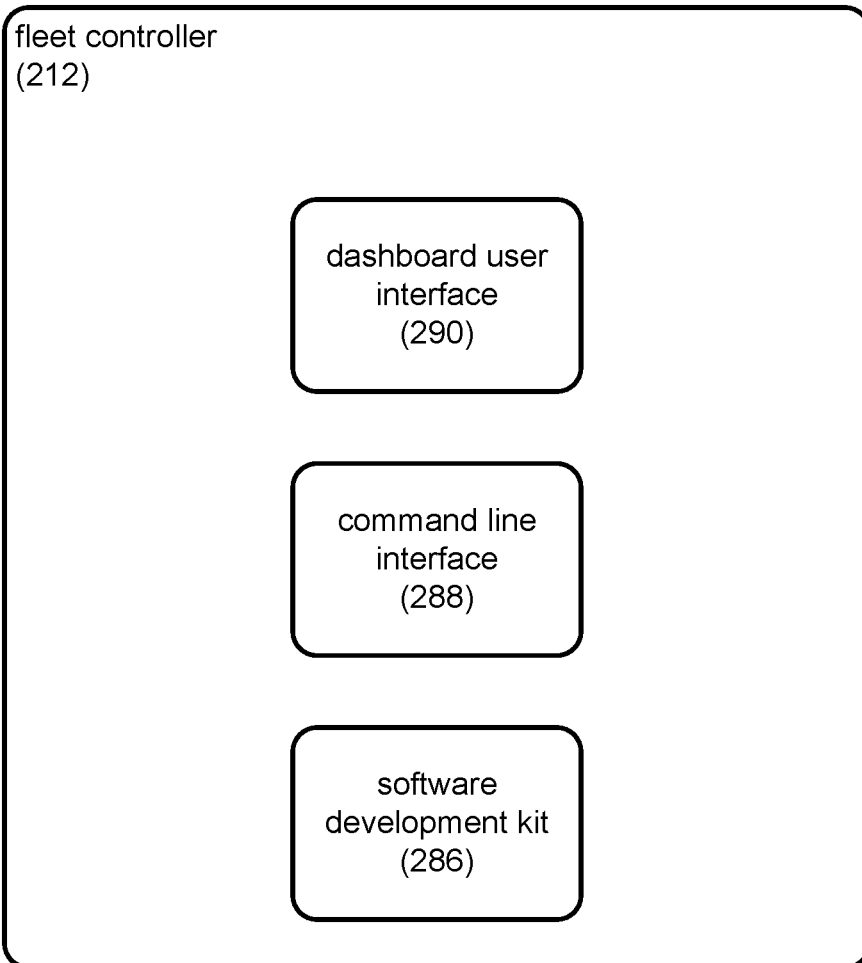
FIG. 2E is a block diagram illustrating an embodiment of a fleet controller component.

FIG. 2E is a block diagram illustrating an embodiment of a fleet controller component. In one embodiment, the fleet controller (212) of FIG. 2A is represented in FIG. 2E.

The fleet controller component provides a plurality of interfaces to a user and/or software developer to interface with the analytic engine ecosystem. A fleet controller (212) binds high-level static descriptions in the model manager (210) to the analytic engine run-time abstraction (222). In one embodiment, the fleet controller (212) may also bind containers with infrastructure or provide an interface to orchestrate containers and infrastructure using a third-party tool such as Kubernetes, Docker Swarm, and/or Mesos. There are at least three interfaces available for the fleet controller (212):

a. A fleet controller SDK (286) that permits a software developer to integrate binding services to their own operational environment. In this case, the model manager (210) may be bypassed and/or unused and the software developer may use their own store for descriptions. The SDK (286) may utilize a RESTful API to communicate with the engines (222) and/or other components of the analytic engine ecosystem;

b. A CLI (288) that permits shell scripting of binding services for automation and integration for an analytic ops user. The CLI (288) may encapsulate and simplify using the same exposed RESTful API that the SDK (286) would use; and c. A dashboard user interface (290), for example a GUI, for an analytic ops user to operate via, for example, a browser. The dashboard (290) may encapsulate and simplify using the same exposed RESTful API that the SDK (286) would use.

In various embodiments and without limitation, a VEE is used for the CLI server (288) and/or dashboard server (290) such as a Docker and/or Linux LxC container.

Figure 2F:
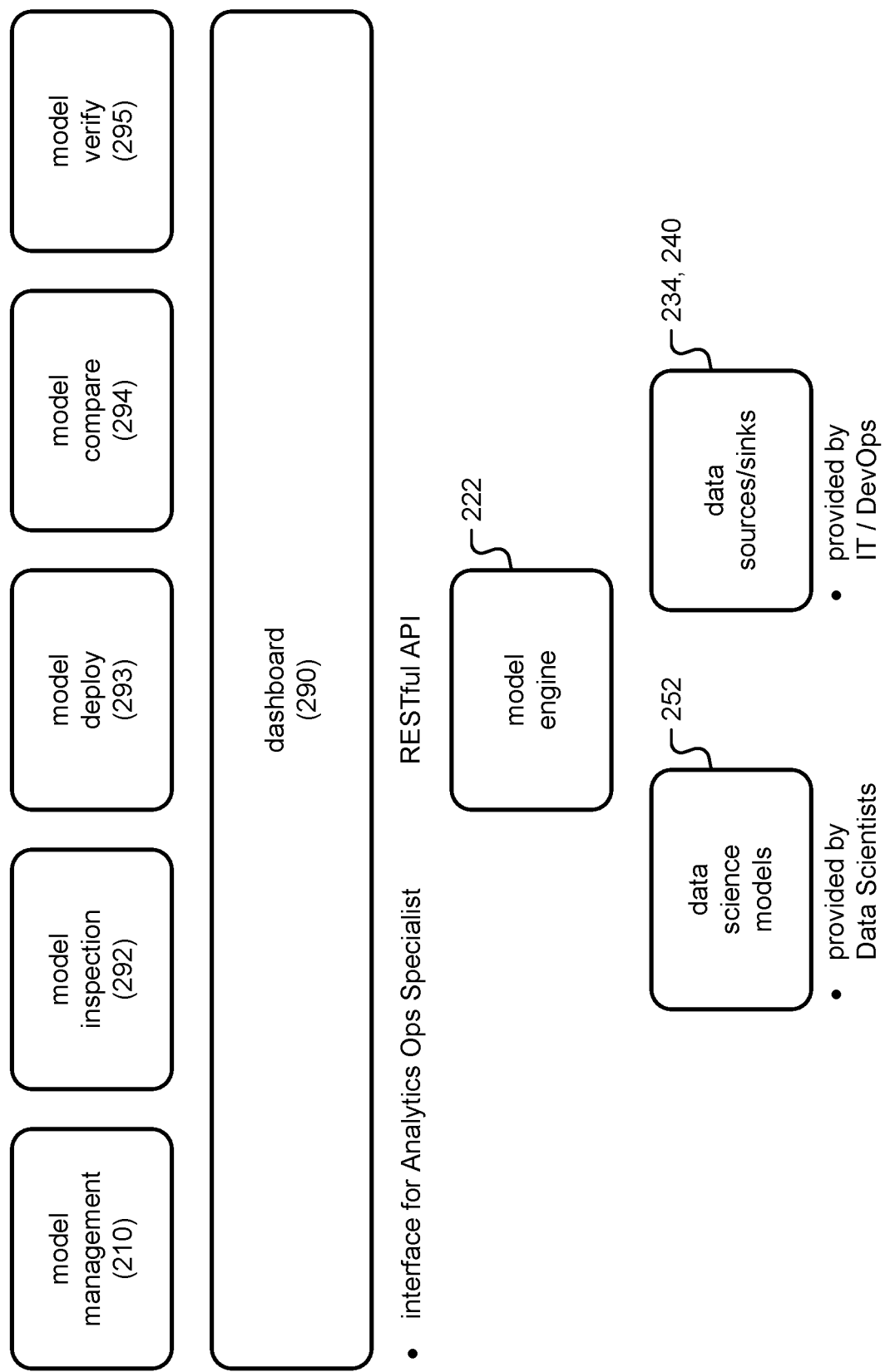
FIG. 2F is a block diagram illustrating an embodiment of a system for an analytic model ecosystem.

FIG. 2F is a block diagram illustrating an embodiment of a system for an analytic model ecosystem.

As described above, data science users provide models (252) while devops users and/or IT users data streams such as data sources (234) and sinks (240) for use with the model engine (222).

The analytics ops specialist may use the fleet controller (212) for example a dashboard (290) via a browser to then interface the model (252), streams (234, 240), and engine (222) with an analytic model ecosystem, comprising:

a. Model management (210) for example a model manager (210) component/container as described above;
b. Model inspection (292) for example a component/container dedicated to inspecting models to identify programming language and conformity with design rules;
c. Model deploy (293) for example a component/container to regulate and scale model deployment as described below;
d. Model compare (294) for example a component/container to compare two or more models in various techniques, for example a champion challenger approach; and/or
e. Model verify (295) for example a component/container to aid in model verification.

Figure 3:
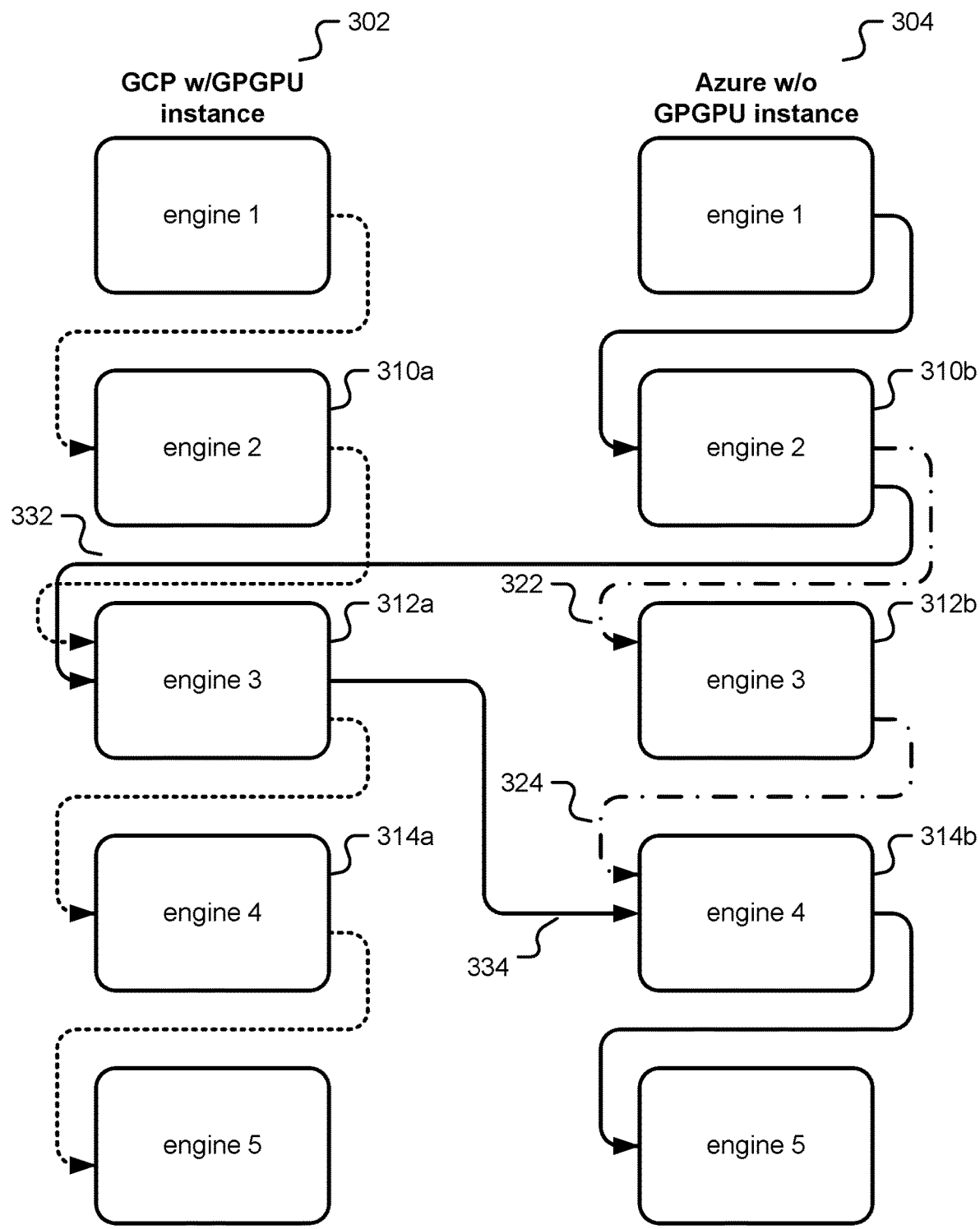
FIG. 3 is a block diagram illustrating an embodiment of a system for an analytic engine pipeline.

FIG. 3 is a block diagram illustrating an embodiment of a system for an analytic engine pipeline. In one embodiment, each of the engines depicted in FIG. 3 are the engines (222) shown in FIG. 2B.

As an example and without limitation, an analytics op specialist deploys two sets of five-engine pipelines: comprising engine 1, engine 2, engine 3, engine 4, and engine 5, each type of engine being identical for the two pipelines for example engine 2 (310a) is identical to engine 2 (310b), engine 3 (312a) is identical to engine 3 (312b), and engine 4 (314a) is identical to engine 4 (314b). One pipeline (302) is deployed in a GCP cloud wherein a GPGPU (general-purpose graphics processor unit) instance is available for numerical analysis. The other pipeline (304) is deployed in an Azure cloud where no such GPGPU instance is available for processing.

At the start of this example, pipeline (304) uses the stream routing as shown with dot-dash lines (322) and (324) to utilize engine 3 (312b). Sensors (272) are deployed in each of the associated models with engines (310)-(314) and it is noted that the performance of engine 3 (312b) is lower than that of engine 3 (312a). The model associated with engine 3 (312) is further noted to be computationally intensive and significantly faster with GPGPU processing.

At run-time, and without any reprogramming of the analytic model and/or participation of a data science user, a separate user may use the RESTful API in conjunction with the fleet controller (212) to reroute engine 2 (310b) from engine 3 (312b) to instead engine 3 (312a) in the GCP cloud with a GPGPU instance, shown in the solid line (332) and (334).

With the model abstraction, stream abstraction, and container abstraction, changing the infrastructure, for example from Azure to GCP, of each unit such as an engine, is facilitated. For example, a user may use the dashboard (290) to specify:

a. Spinning up a second instance of engine 3 (312a) in GCP;
b. Routing the output stream of engine 2 (310b) to the input stream of newly instantiated engine 3 (312a) via route (332); and
c. Routing the output stream of newly instantiated engine 3 (312a) via route (334).

Figure 4A:
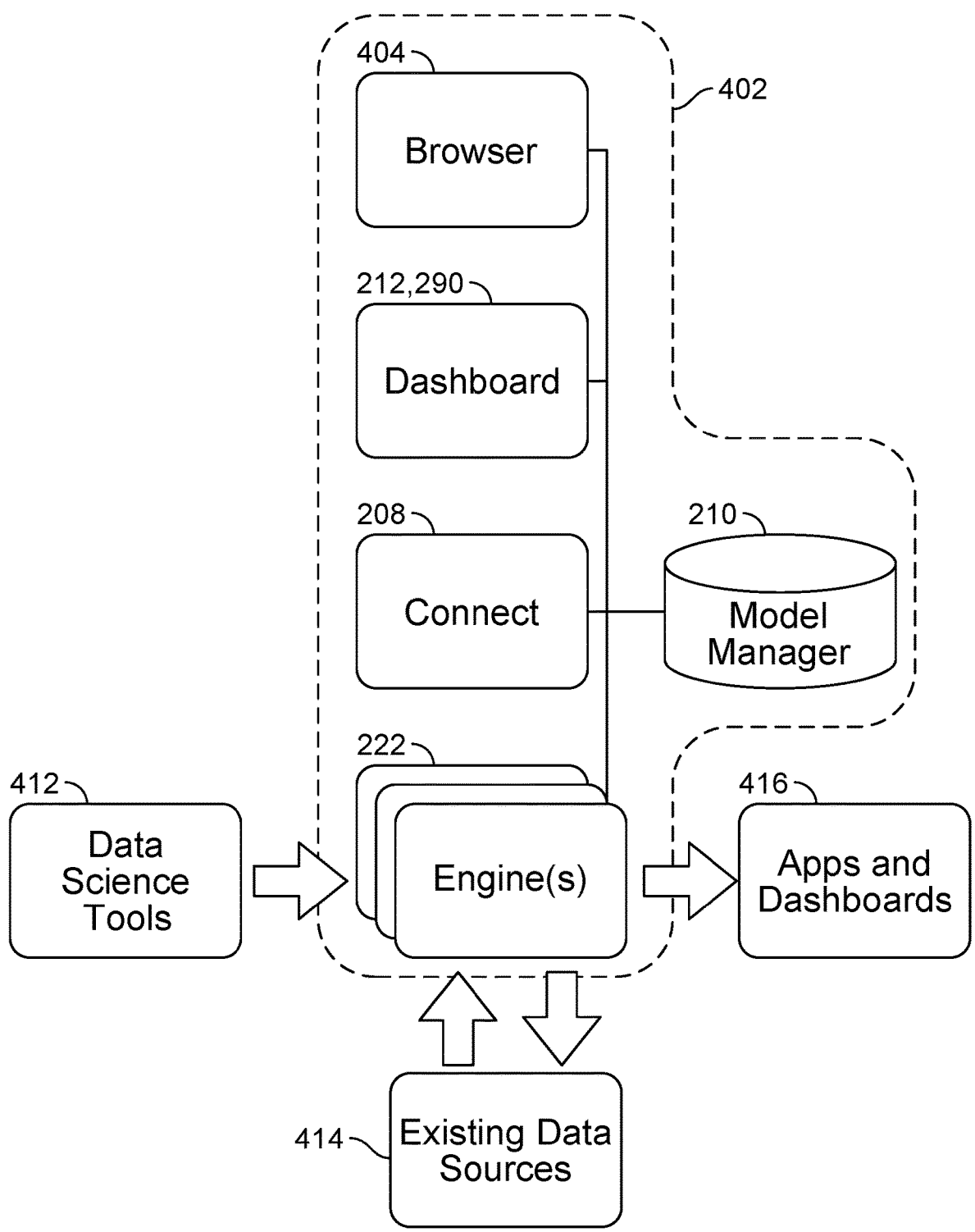
FIG. 4A is a block diagram illustrating an embodiment of a system for an analytic engine ecosystem.

FIG. 4A is a block diagram illustrating an embodiment of a system for an analytic engine ecosystem. In one embodiment, the analytic engine system (402) is an example system as shown in FIG. 2A with a typical usage using a dashboard (212), (290) coupled to a user's browser (404).

The disclosed analytic engine system (402) is designed to interface with a plurality of data science tools (412) including, for example, the following: C, C++, C #, Python, Java, R, S, SAS, PFA, PrettyPFA, H2O, PMML, SPSS, Julia, Magma, Maple, Mathematica, and MATLAB. In this example, libraries and/or packages such as NumPy for scientific and numeric computing, BLAST for bioinformatics, and/or TensorFlow for machine learning are supported. Data science development environments such as Jupyter, IPython, Sage, Apache Zeppelin, and Beaker may be integrated via a plug-in and/or other interface.

The disclosed analytic engine system (402) is designed to interface with a plurality of existing data sources (414) including, for example, the following: Apache Spark, Hadoop, Amazon Redshift, Azure SQL Data Warehouse, Microsoft SQL Server, Teradata. The disclosed analytic engine system (402) is designed to interface with a plurality of front-facing apps and dashboards (416) including, for example, the following: Guidewire, JSON, Llamasoft, Grafana, Domo, and Tableau.

With its modular approach, the system (402) is designed to work with existing IT ecosystems and/or tooling including, for example, the following: microservices orchestration such as Kubernetes, DC/OS, Cloudfoundry; microservices messaging such as Kafka and Confluent; microservices monitoring such as Sysdig and Prometheus; microservices networking such as Weave and Project Calico; microservices foundations such as Docker; operating systems such as CoreOS, Ubuntu, Redhat, Linux, Windows, and MacOS; and infrastructure such as on-premises, off-premises, AWS, Azure, and GCP.

Fastscore Technical Architecture of a Platform for Deploying Analytic Engines.

An example technical architecture of a platform for deploying analytic engines (222) will now be described. The FastScore™ Microservices Suite ("FastScore") is a platform for predictive analytics over data, which are in standard forms including message bus microservices streams (e.g., Kafka), distributed memory systems (e.g., Spark and/or Storm), distributed disk systems (e.g., Hadoop), object stores (e.g., Amazon S3), and other data storage systems. A fundamental unit of work of the platform is an analytic deployment engine (222), which is also referred to herein as a scoring engine or an analytic engine. The analytic deployment engine (222) is designed to execute analytics generally generated from PFA and/or analytic models (e.g., models) from other languages, such as PrettyPFA, R, Python, Julia, and/or other languages. Models that are expressed in PFA before deploying and executing in FastScore generally have a higher level of safety and visibility.

For example, one example architecture for FastScore provides for the following technical features for deploying analytic engines (222) and providing a platform for predictive analytics over data:
1. Scales to tens of thousands deployed models and hundreds of concurrent users;
2. Executes models with or without streaming frameworks (e.g., Hadoop, Spark, Storm);
3. Provides for convenient authoring and translation/conversion of PFA/other models;
4. Provides detailed instrumentation and visibility of running analytic engines including:
   a. Model details generated from PFA static analysis;
   b. JVM details from compiled and running PFA models;
   c. System performance metrics; and
   d. Data science metrics derived from apply PFA models to data sources; and
5. Avoids manual configuration whenever possible.

For example, the disclosed architecture allows for push button deployment and continuous monitoring for analytics. Data science teams may rapidly iterate on their models without IT implementation delays (e.g., update their analytic models, reconfigure their analytic models, test/debug their analytic models, and/or perform A/B testing of their analytic models). Production analytic teams may monitor and tune analytics after they are deployed based on performance measurements/monitoring (e.g., instrument their deployed analytic models and dynamically scale their deployed analytic models based on monitoring/measurements using sensors). In an example deployment, IT may leverage a Docker® container ecosystem to manage deployment of any data science asset.

In an example implementation, FastScore is a secure PFA-based solution for predictive analytics. FastScore may be deployed to a variety of software platforms. For instance, FastScore may run as a Linux process, or as a standalone Mesos task, or as a 'bolt' of a Storm graph. A particular deployment of FastScore may use a unique mix of technologies such as described herein (e.g., Kafka or NSQ for a message queue, Spark or Storm for a streaming framework, Mesos or YARN for a cluster scheduler, etc.), and may be selected based on design choices of enterprises/customers or for other performance/cost reasons.

These and other aspects of the disclosed architecture for FastScore are further described below.

Microservices.

In one embodiment, each component of the FastScore platform is delivered as a microservice. This microservice architecture approach favors deployment flexibility, increased ability to automate with standard system level tools (e.g., Docker or similar tools), as well as the ability to scale services and compose new services with system administrators and DevOps professionals rather than specialized developers and tools. For example, the FastScore microservices may generally follow a FastScore Microservice Pattern embodiment with a stack of:
   a. Core Service Libraries and Programs; on top of
   b. FastScore APIs and Interfaces; on top of
   c. Communication Services; on top of
   d. Docker Linux.

Referring to the above, each of the FastScore microservices and/or components will now be described providing example implementation details for each of these microservice layers.

Core Service Libraries and Programs:
Code at this layer provides the core semantics and functionality of the microservice. For example, an Engine microservice may provide a PFA-based score service by embedding a Hadrian PFA JIT compiler at this level.

FastScore APIs and Interfaces:
Code at this layer maps the core functionality to the communication services layer and embeds the specific semantics that define the microservices. The demo servlet wrapper for Hadrian is an example of code at this layer, which maps specific Hadrian-based semantics to Apache Tomcat.

Communication Services:
These are the third party libraries and systems that support the specific communication schemes that clients use to interact with the microservices. Different services may use different languages, systems, and libraries to implement this layer. In this example, given that the Engine microservice utilizes the Hadrian library which is written in Scala, Tomcat may be used to provide the REST API semantics at this level. A Model Manager microservice on the other hand may use Cowboy (e.g., or another HTTP server implementation) at this level.

Docker Linux:
Docker may be utilized as the unit of deployment for all FastScore microservices. In this way, FastScore microservices may be composed, deployed and managed using standard schedulers and other tools in the Docker ecosystem, such as Kubernetes, Swarm, Apache, Mesos, and/or other commercially available and/or open source schedulers/tools for the Docker eco-system. In this example, the only restriction in packaging the microservice into the Docker container is that it generally does not have any reliance on special kernel modifications, because each Docker container shares the Linux kernel of the host OS.

One example of the FastScore microservice patterns for the Engine Microservice (222) for executing analytic engines is a stack:
   a. Hadrian; on top of
   b. API/Interfaces; on top of
   c. Tomcat and Kafka; on top of
   d. Docker Linux, to be coupled with REST clients, for example through a RESTful API, and also to be coupled with Kafka peers.

An example of the FastScore microservice patterns for the Model Manage Microservice (210) for managing deployed analytic engines is a stack:
   a. Mnesia; on top of
   b. API/Interfaces; on top of
   c. Cowboy; on top of
   d. Docker Linux, to be coupled with REST clients, for example through a RESTful API.

An example of the FastScore microservice patterns for the Model Inspect Microservice (292) for inspecting analytic models is a stack:
   a. Titus; on top of
   b. API/Interfaces; on top of
   c. Django; on top of
   d. Docker Linux, to be coupled with REST clients, for example through a RESTful API.

Unit Performance and Complexity at Scale.

Performance is generally reduced for any given instance of a microservice due to the variety of I/O boundaries. Scaling a microservices architecture may lead to management and operational complexity. In order to deal with both of these potential complexities and/or tradeoffs, an automation framework may be provided to maintain operational overhead constant relative to scale and may allow scale to overcome the per container performance penalties by allowing concurrent execution and I/O paths.

User Interface (UI): Dashboard Microservice.

The Dashboard microservice (290) may also follow the FastScore microservice pattern. An example of the FastScore microservice patterns for the Dashboard Microservice is a stack:

a. Material, Angular, and/or other UI framework; on top of
b. API/Interfaces; on top of
c. HTTPD and/or NGINX; on top of
d. Docker Linux, to be coupled with browser clients.

In an example deployment, the disclosed and/or backend microservices components of FastScore may be deployed and executed in the cloud or dedicated servers in an enterprise data center.

The FastScore microservices may be implemented to support REST command-line (CLI) interfaces. For example, some of the FastScore microservices may support interfaces using graphical user interface (GUI) functionality within a Dashboard. The CLI commands may be made self-explanatory and may correspond closely to REST API calls.

Backend Microservices.

In this example, there are two backend microservices/components: a Facade and an Engine. As described herein, a "facade" (in lowercase letters) or an "engine" (in lowercase letters) is used to refer to an instance of the corresponding microservice/component. A FastScore cluster may have many facades and many engines. Both microservices/components may be packaged as Docker images. Both microservices/components may run as a Linux process or as a task under cluster schedulers, such as using Marathon/Mesos, and/or other commercially available and/or open source schedulers for the Docker eco-system.

There are several standard components FastScore generally utilizes to function. An example list of such components includes Kafka and/or NSQ (e.g., providing a message queue), MySQL (e.g., providing a database), and HAProxy (e.g., providing a load balancer). FastScore generally does not depend on a particular message queue or a database. The FastScore platform may be implemented to flexibly support a variety of existing and/or new message queues or databases.

RESTful APIs.

The FastScore platform may be implemented to support various interfaces between components/microservices. For example, RESTful APIs are provided to support communications between components/microservices of the FastScore platform (e.g., over HTTPS and/or other network communication protocols).

Example System Component Architecture

Figure 4B:
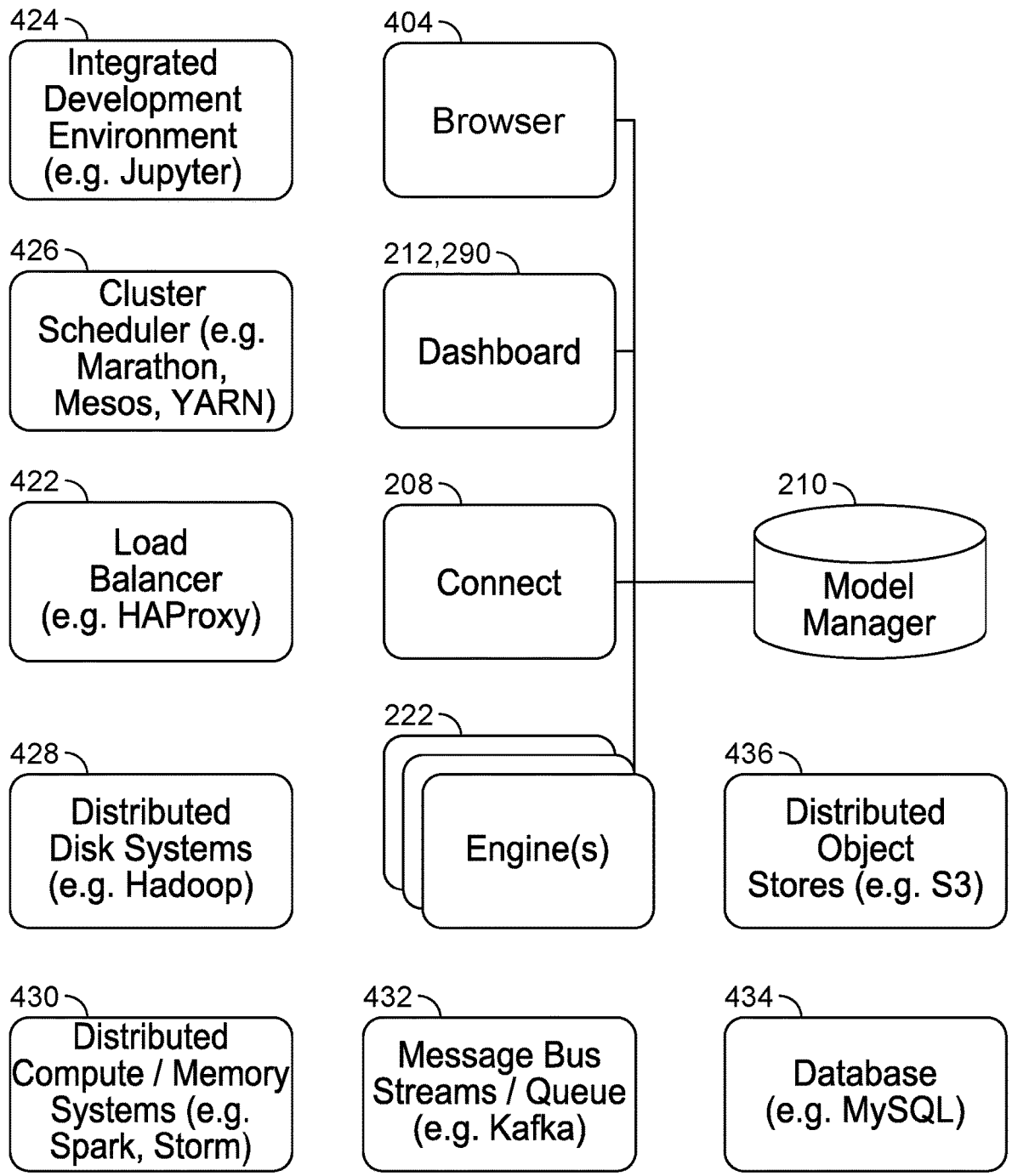
FIG. 4B is an example system component architecture of the FastScore platform.

FIG. 4B is an example system component architecture of the FastScore platform. As shown, the FastScore platform may include a plurality of engines (222), Connect component/microservice (208), Model Manager component/microservice (210), and a Dashboard component/microservice (290) and/or Fleet Controller (212).

Connect Microservice.

Referring to FIG. 4B, the Connect component/microservice (208) is the central communication point of a multi-microservice FastScore implementation. In this example, Connect (208) publishes a REST API accessible by UI (e.g., Dashboard). Any communication between UI and the backend can be performed through an instance of the Connect microservice (208). In some cases, a FastScore implementation may use a load balancer (422) in front of a fleet of Connect instances for workload balancing across the fleet of Connect instances (208).

For example, the Connect microservice (208) may be configured to generally accepts requests from other components/microservices of the FastScore platform and typically translates them into calls to an API of a standard component, such as MySQL, Kafka, and/or another component/microservice. Connect instances (208) may be implemented as stateless and thus interchangeable. As such, a load balancer (422) such as HAProxy may choose a different Connect instance (208) to serve the next request from the same client.

Furthermore, other components of the ecosystem may be added or developed including an integrated development environment (424) such as Jupyter, cluster scheduler (426) such as Marathon, Mesos and/or YARN, distributed disk system (428) such as Hadoop, distributed compute/memory system (430) such as Spark and/or Storm, message bus stream/queue (432) such as Kafka, database (434) such as MySQL, and distributed object store (436) such as S3.

A Connect instance (208) may be implemented to use a database for persistent data and a message queue for transient asynchronously-delivered data. Other components may access the database and the (system) message queue through a Connect API. In this example implementation, engines (222) may access message queues that contain input data directly. The persistent state may include user profiles, their models, and stream descriptors.

User Management.

In an example implementation, calls to a facade are generally required to be authenticated. As a convenience, a user may login to the FastScore platform permanently using the CLI built into Connect (208) to provide their user credentials (e.g., username and password for their FastScore login), which may then store the user's credentials on their local machine (e.g., local computing device) and subsequent FastScore commands may be configured to use them by default (e.g., and does not require the use of session cookies, in which calls can be checked using the Basic HTTP authentication method).

Stream Management.

As similarly described above, the FastScore Engine (222) operates on data streams. Users may specify/describe data streams (e.g., input/output schemas may be utilized as a data stream descriptor) and later use them to execute their analytic models. For instance, a data stream descriptor may be a JSON, AVRO, and/or another encoding/resource, and its contents generally depend on the nature of the data stream, such as provided in the below example.

```
{
    "description": "CME Incremental Refresh Messages",
    "connect": {
        "type": "kafka",
        "topic": "cme-incremental-updates"
    }
}
```

A user may manipulate stream descriptors as follows:

```
fastscore stream add <stream-name> <str1.json>
fastscore stream list
fastscore stream show <stream-name>
fastscore stream remove <stream-name>
```

In some cases, utility commands may be provided with the platform to help users write stream descriptors. Examples of such utility commands may include the following examples:

```
fastscore stream sample <stream-name>   # get sample data from stream
stream
fastscore stream kafka-topics           # list topics from local Kafka
```

Figure 5A:
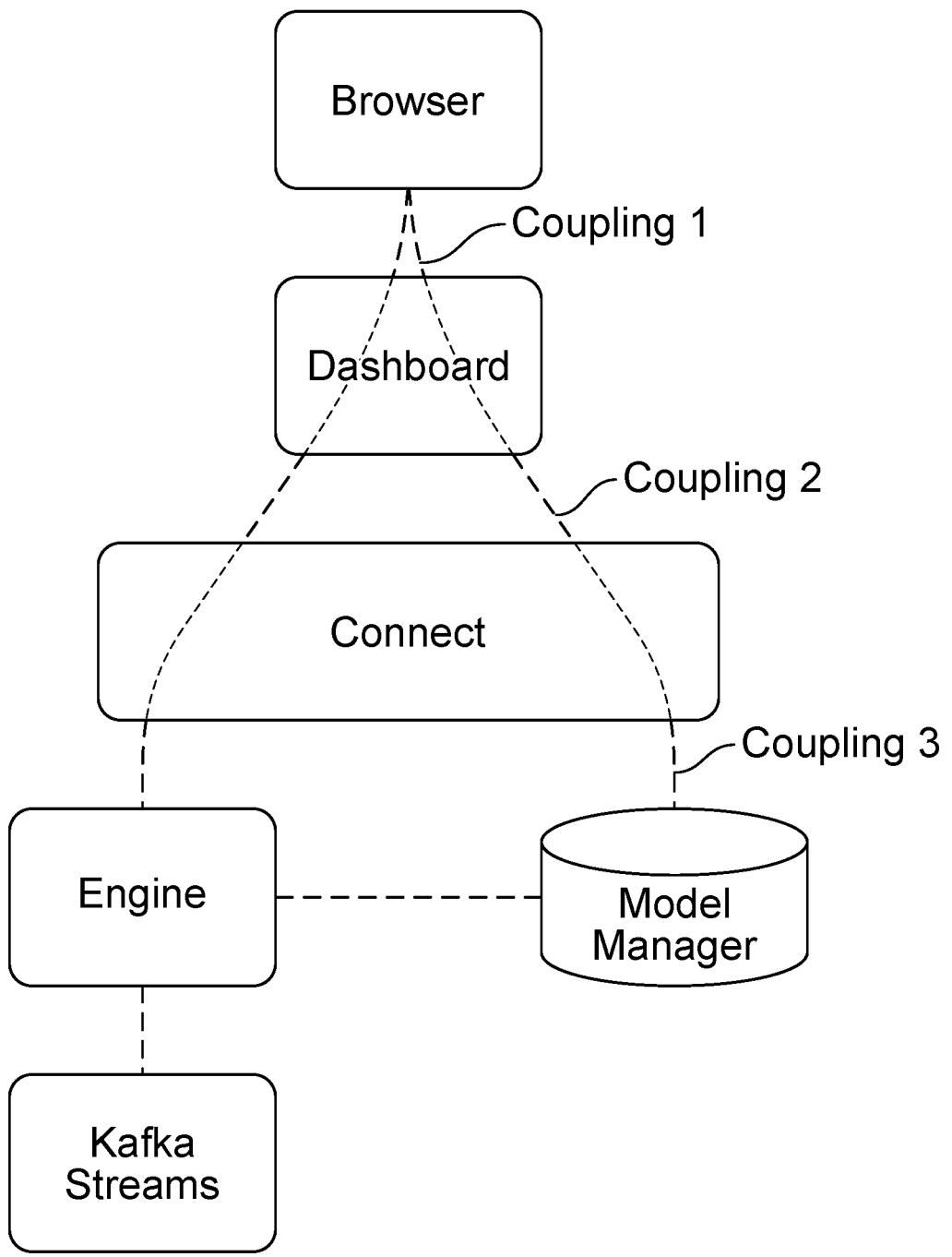
FIG. 5A is an example of stream-related requests involving a series of roundtrips to a database through a Connect microservice.

FIG. 5A is an example of stream-related requests involving a series of roundtrips to a database through a Connect microservice.

Model Management.

In this example implementation, model management is similar to the management of stream descriptors as shown in the following, indicated by coupling 1, coupling 2, and coupling 3 in FIG. 5A:

```
fastscore model add <model1.json>
fastscore model list
fastscore model show <model-name>
fastscore model remove <model-name>
```

A model may have different representations. The canonical representation may be implemented using a JSON document, a PrettyPFA representation, or another representation. All requests and responses related to model may generally use a correct content type as given in the table below:

| Model format | Content-Type | Note |
|---|---|---|
| JSON | application/vnd.pfa+json | |
| PrettyPFA | application/vnd.ppfa | |

In this example, the facade can derive the content type from the extension of the requested resource. For example, GET/l/models/<model-name>.ppfa requests a PrettyPFA representation of the model.

Figure 5B:
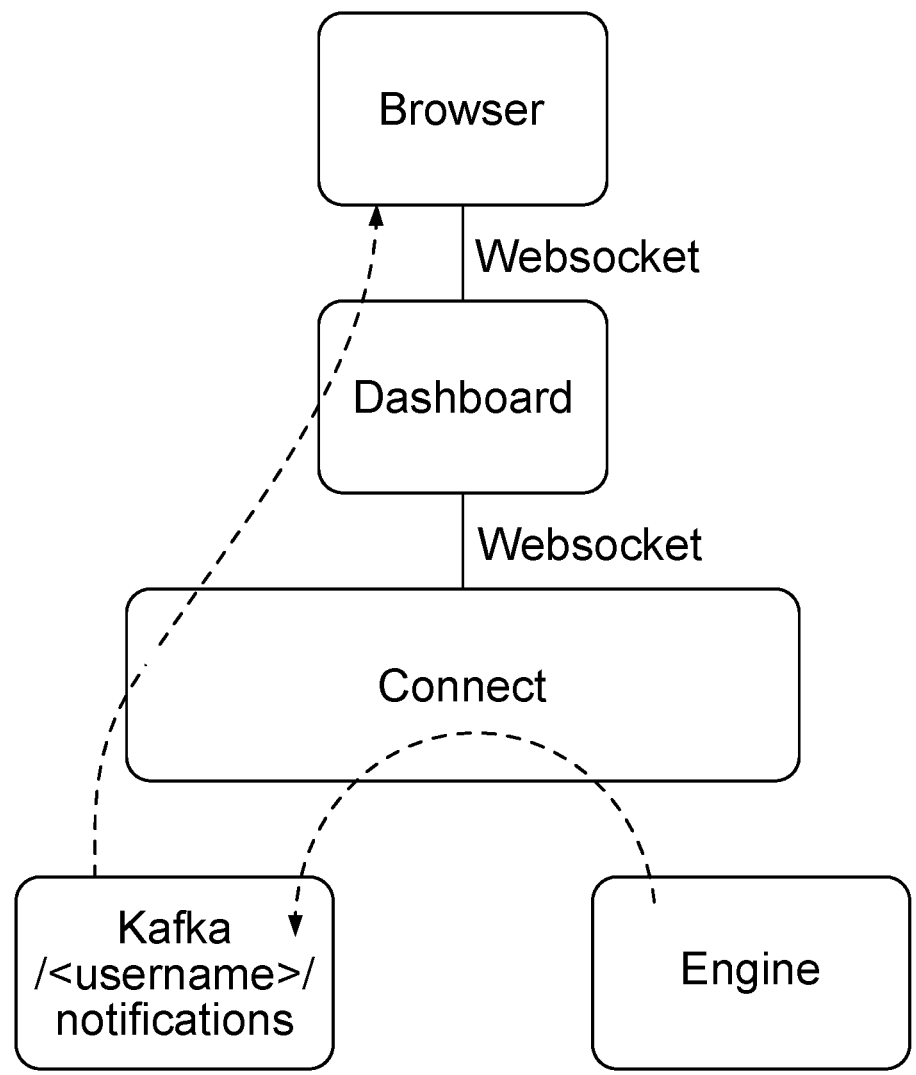
FIG. 5B illustrates an example wherein a facade manages asynchronous notifications from running engines using web sockets.

Asynchronous Notifications. FIG. 5B illustrates an example wherein a facade manages asynchronous notifications from running engines using web sockets. The notification may include log messages and engine outputs. A UI component may generally be ready to reconnect a web socket upon error as the facade may restart at any time.

The facade itself receives the notifications it posts to the web socket from a (system) message queue. Engines are generally not connected to a (system) message queue directly. They use a facade to post log messages and model outputs to the (system) message queue under a topic named /<user-name>/notifications.

To receive asynchronous notifications, a user may issue a fasts core watch command or wait for completion of a model using fastscore model wait <model-name>. The GUI may have the asynchronous channel open at all times.

Startup.

In this example implementation, when launched, a facade generally has no prior knowledge of its surroundings. The Docker image is the same for all facades and no configuration is typically passed to it. A facade may use autodiscovery to connect to other components, and/or may also find and register with a load balancer (422) (if any). The facade may also use autodiscovery to locate a database (434) and a (system) message queue (432).

The facade may also automatically discern between running as a standalone process or as a task under control of a scheduler (426), such as using Marathon/Mesos and/or YARN, and/or other commercially available and/or open source schedulers for the Docker eco-system.

FastScore Engine.

The traditional use of the term 'engine' is the scoring engine generated by the FastScore compiler. As described throughout this specification, the term 'PFAEngine' is used instead to refer to that traditional use of the term 'engine', and the term 'engine' is used throughout this specification to instead refer to a component of the FastScore platform that generates a PFAEngine from a model, connects it to inputs, and collects its outputs. Thus an engine may comprise a PFAEngine within.

Configuration and Startup.

In an example implementation, each of the engines use an identical Docker image. The configuration is passed to an engine using environment variables, such as the variables shown in the below table.

| Variable | Description |
|---|---|
| FASTSCORE_USER | A user name |
| FASTSCORE_MODEL | A model name |
| FASTSCORE_INPUT | An input stream name |

In this example, each of the variables values are references, not actual values. The engine retrieves the model and stream descriptors from a database (e.g., using a facade).

An example of JSON resource that describes the engine for Marathon/Mesos and/or another scheduler:

```
{
    "cmd": "launcher",
    "cpus": 0.5,
    "mem": 256.0,
    "instances": 3,
    "container": {
        "type": "DOCKER",
        "docker": {
            "image": "fastscore/engine",
            "network": "HOST"
        }
    },
    "env": {
        "FASTSCORE_USER": "mk",
        "FASTSCORE_MODEL": "orderbook-demo.ppfa",
        "FASTSCORE_INPUT": "cme-mdp"
    }
}
```

Running Models.

A user can start/stop engine(s) using the following commands:

```
fastscore job run <model-name> <stream-name>
fastscore job list
fastscore job scale
fastscore job status <job-id>
fastscore job output <job-id>
fastscore job stop <job-id>
```

In this example, each job may include many running engines. Jobs may generally not be kept in the database. Jobs may be reconstructed upon request using services of the underlying computing platform.

Specifically, an engine decodes the input stream descriptor, connects to the corresponding source, and starts feeding data to a PFAEngine. In some cases, re-running the streams may be performed when debugging the model.

Logging and Outputs.

Figure 5C:
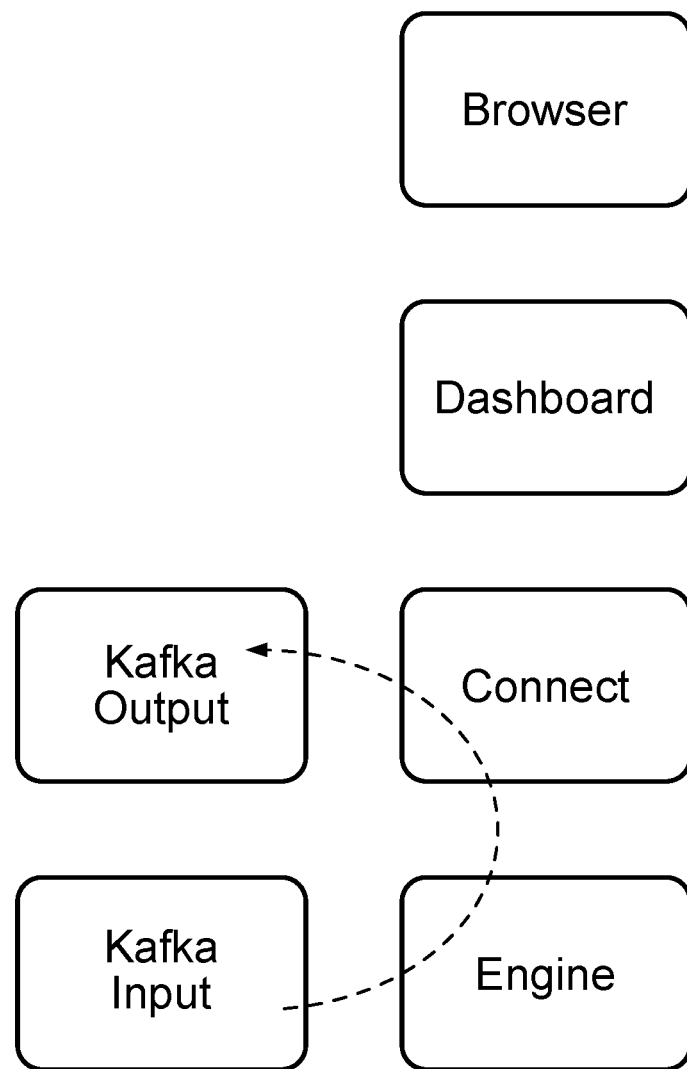
FIG. 5C illustrates collecting outputs of an instance of an engine and posting them to the message queue.

FIG. 5C illustrates collecting outputs of an instance of an engine and posting them to the message queue. A similar processing is performed for log messages.

In an example implementation, the FastScore platform including the Engine (222), Connect (208), Dashboard (212, 290), and Model Manager (210) components/microservices may be implemented using the Scala programming language and/or other programming languages may be used for implementing the FastScore platform.

Debugging API.

Debugging may utilize a RESTful API published by an engine.

```
fastscore engine list
fastscore engine stop
fastscore engine next
fastscore engine inspect cell
fastscore engine inspect pool
fastscore engine resume
```

Auto-Discovery.

In this example, a component/microservice automatically finds out how to connect to other components. In addition, a component/microservice is generally ready to reestablish the connection when an error occurs using the same discover process.

Consider the following example. Assume that a facade has to connect to a database (434). It has a list of databases it understands, such as MySQL and Mongo DB. Assuming that MySQL is preferred, the search may start with MySQL. For MySQL, there may be a list of methods to discover location. It may query Mesos-DNS first, then it may look for an AWS instance tagged, or it may try to connect to the TCP port 3306 on the local machine. If all fails, it may then move on to Mongo DB. In addition, the facade may ensure that the database is accessible and contains expected data. Discovery for FastScore components/microservices is further described below.

Discovery for Microservices.

In some cases is may be desirable to reduce/minimize the manual configuration of microservices and to have them configured to perform autodiscovery in order to discover their environment using well-defined mechanisms. An example of such a mechanism is Mesos-DNS, which is a standard component of a Marathon/Mesos cluster. As an example, Model Manager (210) is a FastScore microservice for storing/loading PFA/PPFA models. The PFA/PPFA model may be automatically translated and/or converted from other models in R, Python, C, and/or Java. Other microservices that depend on Model Manager (210) may find it in the cluster as described below. Model Manager (210) itself will generally depend on a database and will have to find, for example, a MySQL (434) instance upon startup. In another example implementation, the Model Manager (410) microservice can store models in memory and, thus, does not depend on a database.

Starting a Microservice.

Below is an example for starting a microservice.

```
{
    "id": "model-manage",
    "container": {
        "type": "DOCKER",
        "docker": {
            "image": "maximk/model-manage:latest",
```

```
            "network": "BRIDGE",
            "portMappings": [
                { "hostPoart": 0, "containerPort": 8443 }
            ],
            "forcePullImage": true
        }
    },
    "cmd": "model_manage/bin/model_manage foreground",
    "instances": 1,
    "cpus": 0.1,
    "mem": 128
}
```

In this example, the microservice binds to the 8433 port inside the container and this port is mapped by Marathon to a random host port. The part of a given task is to discover the value of this randomly assigned host port.

Model Manager (210) is now ready to start on the cluster using the below command:

$ dcos marathon app add model-manage.json

In a few moments a Model Manager (210) instance will start in the cluster. Suppose XYZ, which is a microservice that depends on Model Manager (210), is started. XYZ may directly use model-manage.marathon.mesos as a host name of Model Manager.

Finding out the port number may introduce more complexity. Mesos-DNS exposes a REST API at a well-known location: http://master.mesos:8123. A few examples are provided below.

```
$ curl http://master.mesos:8123/v1/version
{
"Service": "Mesos-DNS",
"URL": "https://github.com/mesosphere/mesos-dns",
"Version": "v0.5.1"
}
$ curl http://master.mesos:8123/v1/hosts/model-manage.marathon.mesos
[
{
"host": "model-manage.marathon.mesos.",
"ip": "10.0.5.183"
}
]
```

A more complex call may return both the ip address and the port number:

```
$ curl http://master.mesos:8123/v1/services/_model-manage._tcp.marathon.mesos
[
{
"service": "_model-manage._tcp.marathon.mesos",
"host": "model-manage-mirhe-s1.marathon.slave.mesos.",
"ip": "10.0.5.183",
"port": "6594"
}
]
```

Thus, upon startup XYZ microservice attempts to get http://master.mesos:8123/vl/services/_{service}._cp.marathon.mesos for each microservice it depends on and later use IP addresses and port numbers returned by these calls. Note that Marathon may redeploy services to other hosts if they crash or change configuration (e.g., microservices can refresh information using Mesos-DNS if an endpoint stops responding).

Fastscore Model Inspection.

Model inspection (292) comprises the intake of data science models (252) from a data science user. To continue the above example, FastScore is a an embodiment of a streaming analytic engine: its core functionality comprises reading in records from a data stream, scoring them, and outputting that score to another data stream. Throughout this specification a 'score' is used in the data science sense as any output and/or prediction of a data science model, and 'scoring' is used to refer to the process of using a model to produce output and/or predictions.

As such, running any model consists of four steps:

a. Loading the model;

b. Configuring input and output streams;

c. Setting Engine parameters; and d. Running the model.

Creating and Loading Models.

FastScore support models in many languages including Python, R, Java, PFA, PrettyPFA, and C. As a model interchange format, PFA provides benefits in performance, scalability, and security, and PrettyPFA is a human-readable equivalent to PFA. R and Python are typically in widespread use amongst data science users.

Models via CLI.

The FastScore CLI (288) allows a user to load models directly from the command line. The list of models currently loaded in FastScore may be viewed using the model list command:

| $ fastscore model list | |
|---|---|
| Name | Type |
| MyModel | Python |

Models may be added with model add <name> <file>, and removed with model remove <name>. Additionally, the fastscore model show <name> command will display the named model.

Models Via Dashboard.

The Dashboard (290) provides functionality to add and manage models via a GUI. To upload a model, an "upload model" widget may be used to choose a model from a local machine. Alternatively, a "select model" widget allows you to select an existing model from the Model Manager (210) by name. Additionally, models may be added, removed, inspected, and edited within the Model Manager (210) GUI.

Design Rules for Models in Python and R. All models may be added to FastScore and executed using the same CLI commands, namely:

fastscore model add <modelname> <path/to/model.extension>

Note that, in order to determine whether a model is Python or R, in one embodiment Engine-X uses file extension (.py for Python, .R for R, .pfa for PFA, and .ppfa for PrettyPFA). Also, in order to score a Python/R model, there are design rules and/or certain constraints on the form for a given model.

FastScore comprises both a Python2 and Python3 model runner (228). In one embodiment, by default, .py files are interpreted as Python2 models—to load a Python3 model, use the file extension .py3, or the flag -type:python3 option with fastscore model add:

fastscore model add -type:python3 my_py3_model path/to/model.py to add a Python3 model.

Design Rules for Python Models.

As a design rule example, Python models should declare a one-argument action( ) function. The minimal example of a Python model is the following:

| model.py |
|---|
| # fastscore.input: input-schema<br># fastscore.output: output-schema<br>def action(datum):<br>    yield 0 |

This model will produce and/or score a 0 for every input. Additionally, Python models may declare begin( ) and end( ) functions, which are called at initialization and completion of the model, respectively. A slightly more sophisticated example of a Python model is the following:

| model.py |
|---|
| # fastscore.input: input-schema<br># fastscore.output: output-schema<br>import cPickle as pickle<br>def begin( ): # perform any initialization needed here<br>    global myObject<br>    myObject = pickle.load(open('object.pkl'))<br>    pass # or do something with the unpickled object<br>def action(datum): # datum is expected to be of the form '{"x":5, "y":6}'<br>    record = datum<br>    x = record['x']<br>    y = record['y']<br>    yield x + y<br>def end( ):<br>    pass |

This model returns the sum of two numbers with the design rule of using yield. Note that FastScore supports the ability to import Python's standard modules, such as the pickle module. Non-default packages may also be added using an import policy, as described below. Custom classes and packages may be loaded using attachments.

R Models.

R models feature similar functionality as Python models, as well as the same constraint for a design rule: the user defines an action function to perform the actual scoring. For example, the analogous model to the Python model above is.

| R |
|---|
| # fastscore.input: input-schema<br># fastscore.output: output-schema<br># Sample input: {"x":5.0, "y":6.0}<br>action <- function(datum) {<br>    x <- datum$x<br>    y <- datum$y<br>    emit(x + y)<br>} |

As a design rule, R uses emit for output.

Java Models.

Models written in the Java language supported includes the following example types of models:

Generic Java code;

POJOs exported from H2O; and/or

Spark MLLib models.

Generic Java models. A generic Java model may execute arbitrary Java code. In order to run this model in the example FastScore architecture, it may implement a particular model interface: the IJavaModel interface. This interface includes design rules for begin, action, and end methods, analogous to Python and R models.

---

Generic Java Model

```
import fastscore.IJavaModel;
public class MyModel implements IJavaModel
{
    public void begin( )
    {
        ...
    }
    public String action(String datum)
    {
        ...
    }
    public void end( )
    {
        ...
    }
}
```

---

H2O Models. Although an H2O model may be structured as a generic Java model, the example FastScore architecture also provides a convenience feature to allow direct import of H2O models. In order to use this feature, the following steps may be taken:
 a. A model should be saved as POJO. Without further modifications, this exported POJO may be used as the model code in FastScore; and
 b. To load the model in FastScore, the model name should match the exported POJO class name, and be explicitly specified as model type "h2o": fastscore model add gbm_pojo_test gbm_pojo_test.java -type:h2o When running H2O models, FastScore may output the original input record appended with an additional "Result" field that represents an array of prediction results. For example, in H2O's GBM airlines sample model, the input and output may be:

---

Input JSON record:

{ "Year": "2017", "Month": "06", "DayofMonth": "04", "DayofWeek": "7", "CRSDepTime": "1030", "UniqueCarrier": "PS", "Origin": "SAN", "Dest": "ORD"}
Output JSON record:

{"CRSDepTime":"1030","Origin":"SAN","Month":"06", "DayOfWeek":"7","Dest":"ORD","Year":"2017","UniqueCarrier": "PS","DayofMonth":"04","Result":["YES"] }

---

Note that the original order of the fields may not be preserved in the output record.

SparkMLLib Models.

The example FastScore architecture includes integrated Apache Spark libraries that allow adding models that leverage Spark MLLib. Java import statements may be safely used for required Spark packages in model code.

A Spark model should follow the same design rules and/or conformance guidelines as a generic Java model, and any previously saved model files/folders, for example Parquet format, may be added as a model attachment. In general, the model may perform Spark context initialization in the begin( ) method.

Below is an example Spark model that assumes that the LogisticRegressionModel was previously created and saved under the scalaLogisticRegressionWithBFGSModel folder and then uploaded to FastScore as an attachment.
MLLibLRModel.java

---

```
import fastscore.IJavaModel;
import org.apache.spark.SparkConf;
import org.apache.spark.SparkContext;
import org.apache.spark.sql.SparkSession;
import org.json.JSONObject;
import org.json.JSONTokener;
import org.apache.spark.mllib.classification.LogisticRegressionModel;
import org.apache.spark.mllib.linalg.Vector;
import org.apache.spark.mllib.linalg.Vectors;
public class MLLibLRModel implements IJavaModel {
    LogisticRegressionModel _lrModel;
    public MLLibLRModel( ) {
        System.out.println("MLLib Linear Regression model");
    }
    public void begin( ) {
        SparkConf conf = new SparkConf( );
        conf.setAppName("ML Lib LR Model");
        conf.setMaster("local");
        conf.set("spark.driver.host", "127.0.0.1");
        SparkSession spark =
SparkSession.builder( ).config(conf).getOrCreate( );
        SparkContext sc = spark.sparkContext( );
        _lrModel = LogisticRegressionModel.load(sc,
"scalaLogisticRegressionWithLBFGSModel");
    }
    public String action(String datum) {
        try {
            Vector dv = Vectors.fromJson(datum);
            double res = _lrModel.predict(dv);
            JSONObject jsonObj = new JSONObject(new JSONTokener
                (datum));
            jsonObj.append("Prediction", res);
            return jsonObj.toString( );
        } catch (Exception e) {
            return e.toString( );
        }
    }
    public void end( ) {
    }
}
```

---

To add this model to FastScore, the following commands may be run:

---

```
tar czvf scalaLogisticRegressionWithLBFGSModel.tar.gz
scalaLogisticRegressionWithLBFGSModel/
fastscore model add MLLibLRModel MLLibLRModel.java
fastscore attachment upload MLLibLRModel
scalaLogisticRegressionWithLBFGSModel.tar.gz
```

---

JARs.

If a Java model requires one or more JAR files, they may be supplied together with any other required files as a single ZIP or .tar.gz attachment. The Java runner (228) will add all supplied JARs into the class path during compilation and runtime, so the model may safely import any required packages from these JARs.

Input and Output Schema.

FastScore may enforce strong typing on both the inputs and outputs of its models using AVRO schema. For R and Python models, this typing is enforced by specifying schema names in a smart comment at the top of the model file:

---

```
# fastscore.input: array-double
# fastscore.output: double
```

---

Python and R models specify schemas for their inputs and outputs. PrettyPFA and PFA models already contain the input and output schema as part of the model definition, so they may not require a schema attachment.

For example, a model that expects to receive records of two doubles as inputs might have the following schema:

---
input.avsc
---
```
{
    "name": "Input",
    "type": "record",
    "fields" : [
        {"name": "x", "type": "double"},
        {"name": "y", "type": "double"}
    ]
}
```
---

The model might then produce a stream of doubles as its output:

---
output.avsc
---
```
{
    "name": "Output",
    "type": "double"
}
```
---

Input and output schema may be uploaded separately to FastScore. To upload the schema to FastScore with the CLI (288), the following commands may be used:

---
```
fastscore schema add input input.avsc
fastscore schema add output output.avsc
```
---

Attachments may also be managed from within the Dashboard (290), using a Model Manager (210) UI.

Input and Output Streams.

Before a model may be run, it generally should have some data to run on. Input and output streams may be used to supply the incoming data to the model, and to return corresponding scores. Many types of stream transports are supported including: file, Kafka, HTTP, TCP, UDP, ODBC, debug, and console streams. In one embodiment, each type may be configured using a Stream Descriptor file.

Stream Descriptors are small JSON files containing information about the stream. An example of a Stream Descriptor for a Kafka stream is displayed below:

---
JSON
---
```
{
    "Description": "read Avro-typed JSON records from a Kafka stream",
    "Transport": {
        "Type": "kafka",
        "BootstrapServers": ["127.0.0.1:9092"],
        "Topic": "data-feed-1",
        "Partition": 0
    },
    "Encoding": "json",
    "Schema": { type: "record", ...
}
```
---

An example type of stream to use is a file stream, which reads or writes records directly from/to a file inside of the FastScore engine container. An example of such a stream is as follows:

---
file-stream-in.json
---
```
{
    "Description": "read input from the specified file",
    "Loop": false,
    "Transport": {
        "Type": "file",
        "Path": "/root/data/neural_net_input.jsons"
    },
    "Envelope": "delimited",
    "Encoding": "json",
    "Schema": {"type": "array", "items": "double"}
}
```
---

This file stream expects each line of the neural_net_input.jsons file to be a vector of doubles, encoded as a JSON object, and delimitated by newlines. The file is located in the/root/data/directory of the engine container. The "Loop": false line indicates to FastScore to stop reading the file after reaching the end of the file, as opposed to looping over the lines in the file.

Streams via CLI.

The FastScore CLI (288) may be used to configure data streams. The stream list command displays a list of existing streams:

---
Shell
---
```
$ fastscore stream list
    demo-1
    demo-2
```
---

By default, two demo file streams may be included in FastScore. The demo-1 data set consists of random numbers. The demo-2 dataset consists of lists of JSONS with the following AVRO schema:

---
JSON
---
```
{
    "type":"array",
    "items": {
        "type": "record",
        "fields": [
            {"name":"x", "type":"double"},
            {"name":"y", "type":"string"}]
    }
}
```
---

These demo streams may be used to test whether or not a simple model is working correctly. Additional streams may be added using the fastscore stream add <stream-name> <stream-descriptor-file> command. Existing streams may be sampled (displaying the most recent items of the stream) with fastscore stream sample <stream-name>.

For filestreams, it is efficient to manage container input and output by linking a directory on the host machine to the engine container. This may be done in the Docker-Compose file by modifying the engine service to the following:

---
YAML
---
```
[...]
engine-1:
    image: fastscore/engine-x:1.4
    network_mode: "host"
    stdin_open: true
    tty: true
```

```YAML
environment:
    CONNECT_PREFIX: htttps://127.0.0.1:8001
volumes:                  # new volume section
    - ./data:/root/data
[...]
```

This links the ./data directory on the host machine to the /root/data directory of the engine container. A filestream from the file "mydata.jsons" located in data on the host machine may then be accessed by FastScore using the stream descriptor

```JSON
{
    "Loop": false,
    "Transport": {
        "Type": "file",
        "Path": "/root/data/mydata.jsons"
    },
    "Envelope": "delimited",
    "Encoding": "json",
    "Schema": [...]
}
```

A similar stream descriptor can be used for the output stream to write the output scores to a file in the same directory. Note that when using Docker volume linking to link a directory on the host machine to the Engine instance, Docker generally should have privileges to read and write from the specified directory. Additionally, the directory on the container should be chosen carefully, as its contents will be overwritten with the contents of the corresponding host directory upon linking. /root/data is safe (as it only contains the demo datafiles), but other directories on the container (e.g., /usr) may not be.

Streams via the Dashboard. Analogously to models, streams may also be manipulated from the Dashboard, for example, by selecting a "Streams" widget under a Model Manager (210)

Engine Parameters.

Engine parameters, such as the number of Engine instances currently running, as well as information about the model, may be displayed on the Dashboard (290) via an Engine (222) UI.

Running a Model in FastScore.

When using Dashboard (290), models may begin scoring as soon as both the model and input/output streams are set from the Engine (222) UI, and no further action from the user is necessarily required. Various statistics about performance and memory usage may be displayed on the Engine tab.

To run a model using the FastScore CLI, the fastscore job sequence of commands may be used:

fastscore job run <model-name> <input-stream-name> <output-stream-name> runs the model named <model-name> with the specified input and output streams.

fastscore job stop halts the currently running model.

fastscore job status and fastscore job statistics display various information about the currently running job.

Some of the statistics displayed by the fastscore job statistics command, such as resource usage, CPU usage and/or memory usage, are also shown on the Dashboard (290) based at least in part on sensors (272).

Import Policy.

Python and R models often make use of libraries, sometimes importing third-party libraries. For example, a Python model may contain the statement import scikit-learn When deploying models in production, it may be valuable to control which libraries are installed and usable by a model. The exemplar FastScore's Engine (222) provides this functionality through import policies.

An import policy manifest describes what the engine should do when a model references certain libraries. The manifest may be a file, for example a YAML-encoded file, with library names for keys. For example, the entry socket: prohibit instructs the engine not to load the model that references the socket library.

The possible entries are:

| Entry | Description |
| --- | --- |
| <my-lib>: prohibit | Do not load the model and issue an error. |
| <my-lib>: warn | Allow the model to run, but issue a warning. |
| <my-lib>: install | Install the library using the default command. |
| <my-lib>:<br>policy: install<br>command: <command> | Install the library using a custom command. |

The engine (222) may know the standard install commands for model runners (228). For example, for Python, the engine may automatically use pip install <my-lib>.

An example import policy manifest would for a Python runner (228) is:

```YAML
os: prohibit
socket: warn
scikit-learn:
    policy: install
    command: pip install scikit-learn=3.2.1
nose: install
```

A (228) model runner's import policy manifest may be loaded from the import.policy file located in the appropriate directory in the engine's filesystem:

For Python2: /root/engine/lib/engine-fs/priv/runners/python

For Python3: /root/engine/lib/engine-fs/priv/runners/python3

For R: /root/engine/lib/engine-fs/priv/runners/R

In one example, the import policy for a model runner is fixed as soon as a model is loaded into the engine, so any changes to import policies must be made before running a model. To copy a new manifest into the container, the docker cp command or an equivalent may be used.

Record Sets and Control Records.

To better handle different model types such as batch models, the exemplar FastScore architecture and its models support using record sets. A record set may be defined as an ordered collection of records. In R and Python, record sets are analogous to data frames and may be deserialized into data frames.

Models with Record Sets.

To configure an R or Python model to use record sets in its inputs or outputs, the # fastscore.recordsets: input or # fastscore.recordsets: output smart comments may be added to the model, respectively. To use record sets in both the input and output streams, the # fastscore.recordsets: both smart comment may be used. No changes to the model's input or output schema are required to use record sets.

Output Conventions.

There is some ambiguity involved when encoding a record set to an Avro type. To resolve this, the example FastScore architecture uses the following mapping conventions/design rules to determine how to encode each element in the output record set:

In Python:
- If each output datum should be an Avro record, the model should yield a Pandas DataFrame;
- If each output datum should be an Avro array, the model should yield a Numpy matrix; and/or
- If each output datum should be an atomic Avro type (such as a double or string), the model should yield a Pandas Series.

In R:
- If each output datum should be an Avro record, the model should yield a data.frame object;
- If each output datum should be an Avro array, the model should yield a matrix object; and/or
- Atomic Avro types may not be supported for R record set output.

Examples

The following model uses record sets as inputs, and returns a single record as output.
Python

```
# fastscore.recordsets: input
# fastscore.input: two_doubles
# fastscore.output: summary_record
def action(record_set):
    sum1 = sum(record_set[0])
    sum2 = sum(record_set[1])
    yield {"sum1":sum1, "sum2":sum2}
```

Note that the variable record_set may be deserialized as a Pandas DataFrame. In this case, the input schema is
{"type":"array", "items":"double" }
and the output schema is

```
{
  "type":"record",
  "name":"summary",
  "fields": [
    {"name":"sum1", "type":"double"},
    {"name":"sum2", "type":"double"}
  ]
}
```

The next model uses record sets for both inputs and outputs.
Python

```
# fastscore.recordsets: both
# fastscore.input: named_doubles
# fastscore.output: named_doubles_with_sum
def action(record_set):
    mydf = record_set
    mydf['sum'] = mydf['x'] + mydf['y']
    yield mydf
```

Here, the input schema is:

```
{
  "type":"record",
  "name":"input",
  "fields":[
    {"name":"x", "type":"double"},
    {"name":"y", "type":"double"}
  ]
}
``` and the output schema is

```
{
  "type":"record",
  "name":"output",
  "fields":[
    {"name":"x", "type":"double"},
    {"name":"y", "type":"double"},
    {"name":"sum", "type":"double"}
  ]
}
```

Streams and Control Records.

To use record sets, input and output streams may be explicitly configured to do so by adding the "Batching": "explicit" flag. For example, a valid input stream descriptor for the second example above might be:

JSON

```
{
  "Loop": false,
  "Transport": {
    "Type": "file",
    "Path": "/root/data/input.jsons"
  },
  "Batching": "explicit",
  "Envelope": "delimited",
  "Encoding": "json",
  "Schema": {"$ref":"named_doubles"}
}
```

Additionally, to use record sets, control records may be injected into the data stream to mark the boundaries of a record set. A control record is a special type of record in the data stream that does not contain input/output data, but instead requests an action to be performed on the stream.

There are at least three types of control records supported in FastScore:

a. end. The "end" control record marks the end of the input stream. The underlying stream transport may contain more data, but this remaining data is ignored. The behavior mimics what happens when a stream receives an EOF signal from its transport;

b. set. The "set" control record marks the end of a record set, and is how a record set-oriented stream is created, as described above;

c. pig. A "pig" control record travels the whole length of the FastScore pipeline. If a "pig" is injected into the input stream, it may appear in the output stream. The purpose of a "pig" is to provide dependency guarantees similar to a memory barrier in a modern CPU—no input records after the "pig" can affect the output records received before the "pig" in the output stream.

Each control record may declare some common properties:

| Name | Type | Description |
|---|---|---|
| id | int (4) | A control record identifier |
| timestamp | long (8) | A number of milliseconds since the unix epoch. Corresponds to the AVRO timestamp logical type (millisecond precision). |
| misc | string | ASCII characters only. |

Control Records may have representations in each of the supported encodings, as described in the following table. This table uses Python 2 literals.

| Encoding | end | set | pig |
|---|---|---|---|
| null | \xfastscore.end | \xfastscore.set | \xfastscore.pig |
| NOTE for null: The record size should be at least 12 bytes. If there are at least 12 more bytes after the 12-byte prefix, then it may contain the ID and timestamp encoded using the '!Q' Python struct format. Any data that follow is the value of the misc property. | | | |
| utf-8 | \u262efastscore.end | \u262efastscore.set | \u262efastscore.pig |
| NOTE for utf-8: ID, timestamp, and misc values may be appended separated by pipes. For example, '\u262efastscore.pig\|1234\|3476304987\|misc-data'. | | | |
| json | {"$fastscore":"end"} | {"$fastscore":"set"} | {"$fastscore":"pig"} |
| NOTE for json: ID, timestamp, and misc values may be added as properties. | | | |

A data stream using JSON encoding for the second model example above might look like the following:

```
{"x":3.0, "y":2.0}
{"x":2.5, "y":2.5}
{"x":-3.2, "y":-1.0}
{"$fastscore":"set"}
```

The corresponding output stream would be:

```
{"x":3.0, "y":2.0, "sum": 5.0}
{"x":2.5, "y":2.5, "sum": 5.0}
{"x":-3.2, "y":-1.0, "sum": -4.2}
{"$fastscore":"set"}
```

State Sharing and Snapshotting.

The exemplar FastScore architecture may support state sharing and snapshotting in models, for example Python and R models. This may be achieved by providing a cell and pool interface to the models. Cells and pools provide persistent storage.

The distinction between a cell and pool is that cells are global variables that are shared across all runners, whereas pools are like environments in R: collections of key-value pairs that are shared across all runners, and may be manipulated at runtime. Additionally, the state of the engine's cells and pools may be "snapshotted": saved and exported for later use.

State Management.

The cell-and-pool system may allow multiple instances of a model runner (228) to share data. Below are examples of models that may be run concurrently. To change the number of instances running a model, the fastscore job scale CLI (288) command may be used, the /job/scale API (286) call may be used, or the Dashboard (290) may be used.

For example, the R programming language does not support concurrency well. The system disclosed may automatically scale, based on input from sensors (272), a plurality of R-based model engines (222) to parallelize tasks if for example a sensor (272) indicates that the CPU resources are not being utilized efficiently. A state sharing and/or a state snapshotting to be saved externally make such scaling possible and/or efficient.

Both of the sample models below use state management in similar ways. A key difference is that the cell model updates a global variable named 'counter', whereas the pool model updates the 'x' key inside of the 'counter' pool. The Python model cell example:

| Cell Model. Python Cell Example. |
|---|
| # fastscore.input: int<br># fastscore.output: int<br>import fastscore<br>def begin( ):<br>    fastscore.cells('counter').set(0)<br>def action(x):<br>    counter = fastscore.cells('counter')<br>    counter.update(lambda y: x + y)<br>    yield counter.value |

The R model cell example:

| Cell Model. R Cell Example. |
|---|
| # fastscore.input: int<br># fastscore.output: int<br>library(fastscore)<br>begin <- function( ) {<br>    counter <- Cell('counter')<br>    Set(counter, 0)<br>}<br>action <- function(x) {<br>    counter <- Cell('counter')<br>    Update(counter, function(y) y + x)<br>    emit(Get(counter))<br>} |

For a given input, this example model returns the sum of the total number of inputs and the value of the input. So, for example, the expected output of the inputs 1, 2, 3 is 1, 3, 6.

The Python model pool example:

| Pool Model. Python Pool Example. |
|---|
| # fastscore.input: int<br># fastscore.output: int<br>import fastscore<br>def begin( ): |

-continued

Pool Model. Python Pool Example.

```
fastscore.pools('counter').set('x', 0)
def action(v):
    counter = fastscore.pools('counter')
    counter.update('x', lambda x: x + 1)
    yield counter.get('x')
```

The R model pool example:

Pool Model. R Pool Example.

```
# fastscore.input: int
# fastscore.output: int
library(fastscore)
begin <- function( ){
    counter <- Pool('counter')
    Set(counter, 'x', 0)
}
action <- function(datum){
    counter <- Pool('counter')
    Update(counter, 'x', function(x) x + 1)
    emit(Get(counter, 'x'))
}
```

For every input, this example pool model returns the total number of inputs received. So, for example, the expected output of the inputs 5, 5, 5 is 1, 2, 3.

Snapshotting.

Snapshotting is a mechanism for capturing the state of an (222) engine's cells and pools. Model snapshots are automatically created when a model receives an end-of-stream message. To support snapshotting, the exemplar FastScore CLI (288) provides convenient wrappers around the snapshot RESTful API. These commands include:

```
fastscore snapshot list <model name>
fastscore snapshot restore <model name> <snapshot id>
```

Examples of snapshot commands include the snapshot list command shows the saved snapshots for a given model. The snapshot restore command restores the specified snapshot for a particular model. Snapshots may be automatically created upon receipt of an end-of-stream message, but these end-of-stream messages may be introduced as control records into the data stream for streaming transports, for example Kafka. To enable snapshots, a fasts core.snapshots smart comment may be used:
fastscore.snapshots: eof
An example of a Python model that creates snapshots on end of stream is:

Python snapshots

```
# fastscore.input: int
# fastscore.output: int
# fastscore.snapshots: eof
import fastscore
def begin( ):
    cell = fastscore.cells('sum')
    if cell.value == None:
        cell.set(0)
def action(datum):
    cell = fastscore.cells('sum')
    cell.update(lambda x: x + datum)
    yield cell.value
```

An example of an R model that creates snapshots on end of stream is:

R snapshots

```
# fastscore.input: int
# fastscore.output: int
# fastscore.snapshots: eof
library(fastscore)
begin <- function( ){
    cell <- Cell('sum')
    if(length(Get(cell)) == 0){
        Set(cell, 0)
    }
}
action <- function(datum){
    c_sum <- Cell('sum')
    result <- datum + Get(c_sum)
    Set(c_sum, result)
    emit (result)
}
```

Example of Sensors.

Continuing the example for FastScore, an example of a sensor (272) is a configurable function that:

May be turned on and off, such as installed/uninstalled;

May be associated with a particular spot on the code path, such as a "tapping point";

May activate according to a schedule;

May filter/aggregate measurements;

May publish results separately from the output stream;

May have a language-agnostic descriptor; and/or

May output cost-related information.

Examples of potential uses for a sensor (272) includes: record/byte counters at the edge of an input stream; CPU utilization measurements for a main process/loop; and/or a memory usage gauge for a model runner (228). A sensor (272) may be added to a FastScore microservice by default, for example the memory usage monitor present in a Dashboard (290).

Sensor Descriptors.

A sensor descriptor may be conceptually similar to a stream descriptor: it has a name, and is stored in Model Manager (210). A template for a sensor descriptor is:

JSON

```
{
    "Tap": "sys.memory",
    "Activate": {
        "Type": "regular",
        "Interval": 0.5
    },
    "Report": {
        "Interval": 3.0
    },
    "Filter": {
        "Type": ">=",
        "Threshold":1G
    }
}
```

This example of a sensor (272) reports system memory usage, but only if it exceeds 1 gigabyte. Examples of fields for configuring sensors (272) and their corresponding features include the following:

| Field | Explanation | Type |
|---|---|---|
| Tap | The tapping point for the sensor. Currently, this may be One of at least "sys.memory", and "sys.cpu.utilization". | string |
| Activate | A field to describe when to collect sensor readings. In the above example, the sensor activates every 0.5 seconds. | object |
| Activate.Type | Allowed values: "permanent", "regular", "random". | string |
| Activate.Intensity | The number of activation events per second. (The Interval element should be omitted.) | float |
| Activate.Interval | The time between activation events. (The Intensity element should be omitted.) | float |
| Activate.Duration | The time to keep the tapping point active. | float |
| Activate.MaxReads | Deactivate after receiving this many reads. | int |
| Report | A field to describe when to report sensor readings. In the above example, the sensor reports every 3 seconds. | object |
| Report.Interval | How often to report sensor readings. | float |
| Filter | The filtering function of the sensor. May default to null. | object |
| Filter.Type | Allowed values include: ">", ">=" "<", "<=", "within-range", "outside-range", "datatype", "mean", "median", "mode", "standard_deviation", "variance", "pdf", "cdf" | string |
| Filter.Threshold | The threshold value for less-than or greater-than comparisons. | float |
| Filter.MinValue | The minimum value for range filters. | float |
| Filter.MaxValue | The maximum value for range filters | float |
| Aggregate | The aggregation function of the sensor. Accepts "accumulate", "sum", and "count" as shortcuts. May default to "accumulate". | object |
| Aggregate.Type | One of "accumulate", "sum", or "count". | string |
| Aggregate.SampleSize | The maximum number of values to accumulate | int |

Note that filter values such as Threshold, MinValue, and MaxValue may accept human-friendly values, for example "1G" as well as 1073741824.

An Example. To add the sensor example above to FastScore, the CLI (288) may be used:

```
fastscore sensor add s1 <<EOF
{
  "Tap": "sys.memory",
  "Activate": {
    "Type": "regular",
    "Interval": 0.5
  },
  "Report": {
    "Interval": 3.0
  }
}
EOF
```

After entering this command, the CLI (288) may return Sensor 's1' added if the command was successful.

In an example implementation, all sensors (272) may be installed on Model Manager (210). Installing the sensor may include the command:

```
$ fastscore tap install model-manage-1 s1
Sensor 's1' installed [2]
```

The number in the square brackets is the identifier of the sensor deployment. The identifier may be needed to stop the sensor later. It may also be found from the fastscore tap list command:

```
$ fastscore tap list model-manage-1
```

| Id | Tap | Active |
|---|---|---|
| 2 | sys.memory | No |

The example sensor may activate periodically, that is 2 times a second, and collect the memory consumed by the service. The collected data may be reported as Pneumo messages, such as Kafka messages on the topic "notify", every 3 seconds. These may be viewed in the CLI with the fastscore pneumo command:

```
$ fastscore pneumo
[model-manage-1] 16:10:44 sys.memory [2]
[2123345920, 2123345920, 2123345920,
2123345920, 2123345920, 2123345920]
[model-manage-1] 16:10:47 sys.memory [2]
[2123345920, 2123345920, 2123345920,
2123345920, 2123345920, 2123345920]
[model-manage-1] 16:10:50 sys.memory [2]
[2123345920, 2123345920, 2123345920,
2123345920, 2123345920, 2123345920]
```

The sensor may be uninstalled using the fastscore tap uninstall command:

```
$ fastscore tap uninstall model-manage-1 2
Sensor [2] uninstalled
```

Once uninstalled, these reports may no longer be sent through Pneumo.

Example of I/O Descriptor Abstraction.

An I/O descriptor abstraction (232) may be a JSON document that includes all of the information about a stream. In general, an input stream reads messages from an underlying transport, optionally verifies, and feeds them to models. The output stream may act similarly, but in the reverse order. I/O descriptor abstractions are required for the engine to read input and produce output, and may additionally be used to enforce input/output typing, and/or data science constraints using AVRO schema.

In one embodiment, by convention, all field names of an I/O descriptor abstraction (232) start with a capital letter and do not use punctuation. Many fields of an I/O descriptor abstraction (232) that may have default values that depend on values of other fields. If a field is omitted, it may be set to a default value. Sometimes, a user may set a field to null to avoid this default behavior. For example, if omitted, an EndMarker is set to "$end-of-stream" for certain streams. To disable the 'soft' end-of-file behavior based on the End-Marker the field may be set to null. Some fields may accept shortcut values. For instance, Transport field may be set to a "discard" string instead of the equivalent yet more verbose '{"Type": "discard" }' object.

Field Descriptions.

A template for an I/O descriptor abstraction (232) is below. Note that the type of transport used may determine which fields in the Transport section are needed. Additionally, the top-level fields Loop, EndMarker, SkipTo, and SkipToRecord may have default values depending on the choice of transport.

Stream Descriptor Template

```
{
    "Version": "1.2",
    "Description": "My Sample I/O descriptor abstraction",
    "Transport": {
        "Type": "REST"  |  "HTTP"  |  "kafka"  |  "file"
          |  "TCP"  |  "UDP"  |  "debug"  |
"console"  |  "discard",
        "Url" : "http://www.mywebsite.com", // HTTP only
        "BootstrapServers": ["127.0.0.1:9181", "192.168.1.5:9003"], //
Kafka only
        "Topic": "My Kafka Topic", // Kafka only
        "Partition" : 1, // Kafka only, defaults to 0
        "MaxWaitTime": 50000, // Kafka only, defaults to 8388607
        "Path": "/path/to/file.ext", // file only
        "Host": "127.0.0.1", // TCP only
        "Port": 8182, // TCP and UDP only
        "BindTo": "127.0.0.1", // UDP only, defaults to 0.0.0.0
        "Data" : [ "abc", "def", "ghi"], // debug only
        "DataBinary": ["AQIDBQ=="], // debug only,
        use one of Data or DataBinary
    },
    "Loop": false,
    "EndMarker": "$end-of-stream",
    "SkipTo": null,
    "SkipToRecord": "latest",
    "Envelope": "deliminated",
    "Encoding": null  |  "json"  |  "avro-binary",
    "Schema": { . . . } // AVRO schema for stream
}
```

Once an I/O descriptor abstraction (232) has been constructed, it may be validated against the following AVRO schema. Some modification of this schema may be required dependent on the choice of default values.

Stream Descriptor Schema

```
{
  "type": "record",
  "fields": [
  {"name": "Version", "type": "string" },
  {"name": "Description", "type": "string", "default": ""},
```

Stream Descriptor Schema

```
  {"name": "Transport", "type":
    [
      {"type": "record", "fields": [
        "name": "Type", "type":"string"}]}, // REST
      {"type": "record", "fields": [
        {"name": "Type", "type": "string"}, // HTTP
        {"name": "Url", "type": "string"}]},
      {"type": "record", "fields": [
        {"name": "Type", "type": "string"}, // Kafka
        {"name": "BootstrapServers", "type":{"type": "array",
"items":"string"}  },
        {"name": "Topic", "type": "string" },
        {"name": "Partition", "type": "int", "default": 0},
        {"name": "MaxWaitTime", "type": "int",
          "default": 8388607}]},
      {"type": "record", "fields": [
        {"name": "Type", "type": "string"}, // File
        {"name": "Path", "type": "string"}]},
      {"type": "record", "fields": [
        {"name": "Type", "type": "string"}, // TCP
        {"name": "Host", "type": "string"},
        {"name": "Port", "type": "int"}]},
      {"type": "record", "fields": [
        {"name": "Type", "type": "string"}, // UDP
        {"name": "BindTo", "type": "string", "default": "0.0.0.0"},
        {"name": "Port", "type": "int"}]},
      {"type": "record", "fields": [
        {"name": "Type", "type": "string"}, // debug
        {"name": "Data", "type": ["string", {"type": "array", "items":
"string"}]}, // only one of Data or DataBinary is required
        {"name": "DataBinary", "type": "string"}]},
      {"type": "record", "fields": [{"name":"Type", "type": "string"}]},
      "string" // discard or console
    ] },
    {"name": "Loop", "type":"boolean", "default": false},
    // default depends
on transport
    {"name": "EndMarker", "type": ["null", "string"], "default":"$end-of-
stream"}, // default depends on transport
    {"name": "SkipTo", "type": ["null", "int"], "default": null},
    {"name": "SkipToRecord", "type": ["null", "int", "string"],
"default":"latest"}, // default depends on transport
    {"name": "Envelope", "type":
      ["string",
      {"type": "record", "fields": [ // deliminated
        {"name": "Type", "type": "string"},
        {"name": "Seperator", "type": "string", "default":"\n"}]},
      {"type": "record", "fields": [ // ocf-block
        {"name": "Type", "type": "string"},
        {"name": "SyncMarker", "type": "string"}]}
      ] },
    {"name": "Encoding", "type": ["null", "string"]}]},
    {"name": "Schema", "type": ["string", "object"]}
  ]
}
```

Common Fields

The following table describes common fields used in I/O descriptor abstractions (232). Fields in italics may be optional.

| Field | Type | Description | Default Value | Example |
|---|---|---|---|---|
| Version | string | The version of the stream descriptor. | "1.2" | "1.2" |
| Description | string | A description for this stream (optional). | (empty) | "An input file stream." |
| Transport | string or object | Specifies the details of the Transport for this stream (see below). | | |

-continued

| Field | Type | Description | Default Value | Example |
|---|---|---|---|---|
| Loop | boolean | Set to true to read the stream in a loop. | true for filestreams, false otherwise | true |
| EndMarker | string | An end-of-stream marker to indicate that the last message in the stream has been received. | null for AVRO binary streams, $end-of-stream for all others | "LastMessage" |
| SkipTo | int or null | Skip to the byte offset when starting to read the stream. | null | 5 |
| SkipToRecord | int, string, or null | Skip to record by number or keyword. | "latest" for Kafka streams, null otherwise | "latest" |
| Envelope | "deliminated" or "ocf-block" or object | Specifies the framing of the messages in the stream (see below). | "deliminated" or null | "deliminated" |
| Encoding | null, "avro-binary", or "json" | Specifies the encoding of the messages in the stream. | | |
| Schema | null, string, or object | AVRO schema for records in this stream. | null | "int" |

The Schema field may specify schemas by reference (as well as explicitly define them). A schema reference takes the following example form:
"Schema": {"$ref":"schema_name" }
where schema_name is the name of the schema in Model Manager (210).

Transport Fields.

There are various possible fields in Transport descriptors. As before, fields in italics are optional.

REST.

The REST stream transport does not include any additional transport fields.

HTTP.

HTTP streams contain at least one field—the URL to the data source.

| Field | Type | Description | Default | Example |
|---|---|---|---|---|
| Url | string | The URL of the data. | (none) | "http://www.path.to/file.extension" |

Kajfka.

Kafka stream transports have several possible fields:

| Field | Type | Description | Default | Example |
|---|---|---|---|---|
| BootstrapServers | array of string | A list of the Kafka bootstrap servers. | (none) | ["192.168.1.5:9002", "127.0.0.1:9003"] |
| Topic | string | The Kafka topic. | (none) | MyKafkaTopic |
| Partition | int | The Kafka partition. | 0 | 5 |
| MaxWaitTime | int | The maximum time to wait before declaring that the end of the stream has been reached. | 8388607 (approx. 25 days) | 500 |

File.

File streams only have one parameter: the path to the file. Note that the path to the file is relative to the Engine (222) container's filesystem, not the filesystem of the machine hosting the Engine.

| Field | Type | Description | Default | Example |
|---|---|---|---|---|
| Path | string | The path to the file. | (none) | "/path/to/file" |

UDP.

UDP Transports may be described using at least two fields.

| Field | Type | Description | Default | Example |
|---|---|---|---|---|
| BindTo | string | The IP address to bind to. | "0.0.0.0" | "127.0.0.1" |
| Port | int | The port to listen to. | (none) | 8000 |

TCP. TCP transports require at least a mandatory specification for both a host and a port.

| Field | Type | Description | Default | Example |
|---|---|---|---|---|
| Host | string | The IP address of the host machine. | (none) | "127.0.0.1" |
| Port | int | The port of the host machine. | (none) | 8765 |

Debug.

A debug transport type may allow the user to embed a batch of records to be scored directly into an input stream descriptor (232). As the name implies, it is intended primarily for model and stream debugging.

| Field | Type | Description | Default | Example |
|---|---|---|---|---|
| Data | a string or array of string | A single record, or an array of JSON records to be scored. | (none) | ["\"json string\""] |
| DataBinary | a string or array of string | Either a base64-encoded binary datum or an array of base64-encoded messages. | (none) | "AQIDBQ==" |

Console and Discard.

The console and discard transports have no fields. The discard transport discards all content—as such, it only makes sense for output streams where a user does not care about the output of the engine.

Console streams are subtle: output is relayed back to the FastScore CLI (288). In order for this to work, however, the CLI should be in "interactive" mode (i.e., started with the fasts core command), and FastScore may be configured to use Pneumo, a library that enables asynchronous notifications over Kafka.

Transport-Specific Examples

Examples of I/O descriptor abstraction (232) for various combinations of transports, encodings, and envelopes are given below.

REST Stream Examples. The REST transport allows inputs to be delivered to the engine with the /1/job/input/ POST command. If the output stream is also set to REST, the /1/job/output GET command can be used to retrieve the resulting scores.

| JSON |
|---|
| {<br>"Transport": {<br>  "Type": "REST"<br>},<br>"Envelope": "delimited",<br>"Encoding": "JSON",<br>"Schema": null<br>} |

Debug Stream Examples

Below is an example of a debug stream, where the messages are all inline, and separated by newlines.

| Debug Inline Stream |
|---|
| {<br>"Version": "1.2",<br>"Description": "read an inline sequence of 3 messages separated by newlines",<br>"Transport": {<br>  "Type": "debug",<br>  "Data": "aaa\nbbb\nocc"<br>},<br>"Envelope": "delimited",<br>"Encoding": null,<br>"Schema": null<br>} |

Below is an example of a debug stream using a list of binary inputs.

| Debug Binary Stream |
|---|
| {<br>"Version": "1.2",<br>"Description": "read an inline sequence of 3 binary messages",<br>"Transport": {<br>  "Type": "debug",<br>  "DataBinary": ["uKs/srYgWfY=",<br>    "kiqGJppq2Z4=",<br>    "VBPsuSTfUiM="]<br>},<br>"Envelope": "delimited",<br>"Encoding": null,<br>"Schema": null<br>} |

HTTP Examples

The following is an example of an HTTP stream.

| HTTP Example |
|---|
| {<br>"Version": "1.2",<br>"Description": "read a sequence of opaque (unicode) strings separated by newlines over HTTP transport",<br>"Transport": {<br>  "Type": "HTTP",<br>  "Url": "https://s3-us-west-1.amazonaws.com/fastscore-sample-data/prime. test. stream"<br>},<br>"Envelope": {<br>  "Type": "delimited",<br>  "Separator": "\r\n"<br>}, |

HTTP Example
-continued

```
    "Encoding": null,
    "Schema": null
}
```

Kafka Examples

The following example is a stream descriptor for a Kafka input stream.

Kafka Input Example

```
{
    "Version": "1.2",
    "Description": "read a sequence of opaque
(unicode) strings over Kafka transport",
    "Transport": {
        "Type": "kafka",
        "BootstrapServers": ["127.0.0.1:9092"],
        "Topic": "data-feed-1",
        "Partition": 0
    },
    "Envelope": null,
    "Encoding": null,
    "Schema": null
}
```

This example writes a sequence of AVRO-binary typed data to a Kafka stream.

Kafka AVRO-binary

```
{
    "Version": "1.2",
    "Description": "write a sequence of binary-
encoded Avro documents to Kafka",
    "Transport": {
        "Type": "kafka",
        "BootstrapServers": ["127.0.0.1:9092"],
        "Topic": "data-feed-1",
        "Partition": 0
    },
    "Envelope": null,
    "Encoding": "avro-binary",
    "Schema": { type: "record", . . . }
}
```

File Stream Examples

The following is an example of a file stream input, expecting each line of the file to contain an integer. An analogous stream descriptor can be used for a file output stream. Note that /root/data/input.jsons refers to the path to input.jsons inside of the engine container (222), not on the host machine.

File Input Stream

```
{
    "Version": "1.2",
    "Loop": false,
    "Transport": {
        "Type": "file",
        "Path": "/root/data/input.jsons"
    },
    "Envelope": "delimited",
```

File Input Stream
-continued

```
    "Encoding": "json",
    "Schema": "int"
}
```

TCP Examples

Here's an example TCP stream descriptor.

TCP Example

```
{
    "Version": "1.2",
    "Description": "read a sequence of untyped
json separated by newlines over TCP transport",
    "Transport": {
        "Type": "TCP",
        "Host": "127.0.0.1",
        "Port": 12012
    },
    "Envelope": "delimited",
    "Encoding": "json",
    "Schema": null
}
```

UDP Examples

The following stream descriptor describes a UDP input stream.

UDP Example

```
{
    "Version": "1.2",
    "Description": "read a sequence of untyped
json documents over UDP transport",
    "Transport": {
        "Type": "UDP",
        "Bind": "0.0.0.0",
        "Port": 53053
    },
    "Envelope": null,
    "Encoding": "json",
    "Schema": null
}
```

Example Schema Reference

To continue the above example of an analytic engine system, FastScore enforces strict typing of engine inputs and outputs at two levels: stream input/output (232), and model input/output (224). Types may be declared using AVRO schema.

To support this functionality, FastScore's Model Manager (210) maintains a database of named AVRO schemas. Python and R models may then reference their input and output schemas using smart comments. PrettyPFA and PFA models may instead explicitly include their AVRO types as part of the model format. Stream descriptors may either reference a named schema from Model Manager (210), or they may explicitly declare schemas. Throughout this specification, a check may include a datatype check, for example int vs float, or a data science check, for example ensuring the mean or standard deviation of a stream is within tolerances.

In either case, FastScore performs the following type checks:
  a. Before starting a job: the input stream's schema is checked for compatibility against the model's input schema, and the output stream's schema is checked for compatibility against the model's output schema;
  b. When incoming data is received: the incoming data is checked against the input schemas of the stream and model; and/or
  c. When output is produced by the model: the outcoming data is checked against the model and stream's output schemas.

Failures of any of these checks are reported: schema incompatibilities between the model and the input or output streams may produce an error, and the engine (222) will not run the job. Input or output records that are rejected due to schema incompatibility appear as Pneumo messages, and a report of rejected records is also shown in Dashboard's Engine panel.

Examples

The following model takes in a record with three fields (name, x and y), and returns the product of the two numbers.

```
model .py
# fastscore.input: named-array
# fastscore.output: named-double
def action (datum):
  my name = datum['name']
  x = datum['x']
  y = datum['y']
  yield {'name': my_name, 'product':x*y}
```

The corresponding input and output AVRO schema are:

```
named-array.avsc
{
  "type": "record",
  "name": "input",
  "fields": [
    {"name":"name", "type":"string"},
    {"name":"x", "type":"double"},
    {"name":"y", "type":"double"}
  ]
}
```

```
named-double.avsc
{
  "type": "record",
  "name": "output",
  "fields": [
    {"name":"name", "type":"string"},
    "name": "product", "type": "double"
  ]
}
```

So, for example, this model may take as input the JSON record
{"name":"Bob", "x":4.0, "y":1.5}
and score this record to produce
{"name":"Bob", "product":"6.0" }
Once FastScore is running, the model and associated schemas may be added to a model manager (210) with the following commands:

```
fastscore schema add named-array named-array.avsc
fastscore schema add named-double named-double.avsc
fastscore model add my_model model.py
```

Assuming that the input and output descriptor abstractions have been configured to use these schemas, the job may be run with:
fastscore job run my_model <input stream name> <output stream name>
The stream descriptors may be set to use these schemas with the Schema field. For example, for the input stream descriptor:
"Schema":{"$ref":"named-array"}
Note that in both the model's smart comments, the CLI (288) commands, and the stream descriptor schema references, the schemas are referenced by their name in a model manager (210), not the filename or any other property.

Example of Model Deploy.

As an example of a model deploy (293), for the above example of the FastScore architecture, Model Deploy (293) is a containerized Jupyter notebook server with FastScore's model deployment and Jupyter integration toolkit built in. It may be built on top of the Jupyter data science Docker image. Model Deploy provides model creation and deployment tools for R, Python 2, and Python 3 notebooks, as well as for PFA.

Starting Model Deploy.

Starting Model Deploy (293) may include the following command:
docker run -it --rm -p 8888:8888 fastscore/model-deploy:latest
If other services in the FastScore fleet are also running on the same host, it may be advantageous to start Model Deploy (293) with the --net="host" option, so that these services are accessible from localhost.

Model Deploy may also be started with any of the additional configuration options available to the Jupyter base Docker image. Once the container (293) is created, it may be accessible from port 8888 by default on the host machine, using the token generated during the startup process.

Model Deploy functionality. Model Deploy provides a number of features to make it easy to migrate a model (252) into FastScore:
  Python and R supply a Model class that can be used for validation and testing of a model locally, before deploying to a FastScore engine (222);
  The Model.from_string function in Python and Model_from_string function in R provide shortcuts for creating a Model object from a string of code. In Python notebooks, the %%py2model, %%py3model, %%pfamodel, and %%ppfamodel cell magic commands may automatically convert the contents of a cell into a Python, PFA, and PPFA model object, respectively;
  The Engine class allows for direct interaction with a FastScore Engine (222), including scoring data using a running Engine;
  Model objects may be deployed directly to a FastScore Engine (222) from within the Jupyter notebook, as well as to Model Manager (210); and/or
  A utility codec library is included to make it easier to serialize R and Python objects to JSON and other formats based on an Avro schema.

Example notebooks demonstrating this functionality may be included with the Model Deploy container.

Example Tutorial for a Data Science Model

Gradient Boosting Regressors (GBR) are ensemble decision tree regressor models. In this example, a GBR model is prepared for use in the above example of an analytic engine architecture, the FastScore architecture. A model is constructed to estimate the reliability of various automobiles.

The model is constructed in Python using SciKit Learn, and both input and output data streams use Kafka. This example demonstrates several features of FastScore:

Running a trained Python model in FastScore;
Installing additional Python libraries in a FastScore engine;
Using custom classes with model attachments; and/or
Scoring records over Kafka streams
The following uses the Python libraries:
NumPy (numpy)
Pandas (pandas)
SciKit Learn (sklearn)
Kafka (kafka, if you're using the included Python Kafka client)
Each of these libraries may be installed using pip.
Overview of Gradient Boosting Regressors.

Gradient boosting regressors are a type of inductively generated tree ensemble model. At each step, a new tree is trained against the negative gradient of the loss function, which is analogous to (or identical to, in the case of least-squares error) the residual error.

Training and Running a GBR Model in SciKit Learn

This section reviews how to train a GBR model using SciKit Learn in Python.

The Dataset and the Model. A GBR model (252) is designed from a data science users to estimate reliability for various types of automobiles from various features of the vehicle. The scores produced are numbers between −3 and +3, where lower scores indicate safer vehicles.

Transforming Features.

For best results from the GBR model (252), preprocessing of the input data is performed. To keep the model itself as simple as possible, the feature preprocessing is separated from the actual scoring, and encapsulate it in its own module:

FeatureTransformer.py

```
from itertools import chain
import numpy as np
import pandas as pd
from sklearn.base import BaseEstimator, TransformerMixin
from sklearn.preprocessing import Imputer, StandardScaler
from sklearn.pipeline import Pipeline
# define transformer to scale numeric variables
# and one-hot encode categorical ones
class FeatureTransformer (BaseEstimator, TransformerMixin) :
    def __init__(self, transforms = [("impute", Imputer( )), ("scale", StandardScaler( ) ) ] ):
        self.transforms = transforms
    def fit(self, X, y = None):
        self.columns_ = X.columns
        self.cat_columns_ = X.select_dtypes(include = ["object"]).columns
        self.non_cat_columns_ = X.columns.drop(self.cat_columns)
        self.pipe =
Pipeline(self.transforms) .fit(X.ix[:,self.non_cat_columns_])
        self.cat_map_ = {col: X[col] .astype("category").cat.categories
                for col in self.cat_columns_}
        self.ordered_={col: X[col] .astype("category").cat.ordered
                for col in self.cat_columns }
        self.dummy_columns_= {col: ["_".join([col, v])
                    for v in self.cat_map_[col]]
                for col in self.cat_columns_}
        self.transformed_columns_= pd.Index(
            self.non_cat_columns_.tolist( ) +
            list(chain.from_iterable(self.dummy_columns_[k]
                            for k in self.cat_columns_)))
```

FeatureTransformer.py

```
        return self
    def transform(self, X, y = None):
        scaled_cols = pd.DataFrame(self.pipe.transform(X.ix[:, self.non_cat_columns_]),
                        columns = self.non_cat_columns_).reset_index(drop = True)
        cat_cols = X.drop(self.non_cat_columns_.values, 1).reset_index(drop = True)
        scaled_df = pd.concat([scaled_cols, cat_cols], axis = 1)
        final_matrix = (pd.get_dummies(scaled_df)
                .reindex(columns = self.transformed_columns_)
                .fillna(0) .as_matrix( ))
        return final_matrix
```

This is a utility class for imputing raw input records. A typical input record may include:

JSON

```
{
    "engineLocation": "front",
    "numDoors": "four",
    "height": 54.3,
    "stroke": 3.4,
    "peakRPM": 5500,
    "horsepower": 102,
    "bore": 3.19,
    "fuelType": "gas",
    "cityMPG": 24,
    "make": "audi",
    "highwayMPG": 30,
    "driveWheels": "fwd",
    "width": 66.2,
    "curbWeight": 2337,
    "fuelSystem": "mpfi",
    "price": 13950,
    "wheelBase": 99.8,
    "numCylinders": "four",
    "bodyStyle": "sedan",
    "engineSize": 109,
    "aspiration": "std",
    "length": 176.6,
    "compressionRatio": 10.0,
    "engineType": "ohc"
}
```

Many of the features of this record, such as the manufacturer or body style of the car, are categorical, and the numerical variables have not been normalized. Gradient boosting models may work best when all of the input features have been normalized to have zero mean and unit variance.

The FeatureTrans former class performs these imputations using two functions. First, fit trains the FeatureTrans former using the training data. This determines the mean and standard deviation of the training data and rescales the numerical inputs accordingly, as well as converts the categorical entries into collections of dummy variables with one-hot encoding. Fitting the FeatureTrans former is done as part of model training, as discussed below.

The transform function may be used during model scoring to perform streaming imputations of input records. The imputing is done using the information about the mean, variance, and categorical variables determined from the fit function.

Training the Model.

SciKit Learn may be used to build and train the GBR model (252). First, the following libraries are imported:

```
Python import cPickle
import numpy as np
import pandas as pd
from sklearn.ensemble import GradientBoostingRegressor
from sklearn.pipeline import Pipeline
from sklearn.model_selection import GridSearchCV
from sklearn.metrics import mean_squared_error, make_scorer
from FeatureTransformer import FeatureTransformer
``` cPickle is used to store the fined FeatureTrans former, and numpy and pandas perform some manipulation of the input data. Finally, the sklearn libraries are used to train the model. Building and training the model is fairly standard:

```
Python read in training data
in_data = pd.read_json("train_data.json", orient = "records")
X = in_data.drop("risk", 1)
y = np.array(in_data["risk"])
# create feature transformation and training pipeline
preprocess = FeatureTransformer ( )
gbm = GradientBoostingRegressor(learning_rate = 0.1,
random_state = 1234)
pipe = Pipeline([("preprocess", preprocess), ("gbm", gbm)])
# fit model
gbm_cv = GridSearchCV(pipe,
        dict(gbm__n_estimators = [50, 100, 150, 200],
            gbm__max_depth = [5, 6, 7, 8, 9, 10]),
        cv = 5,
        scoring = make_scorer(mean_squared_error),
        verbose = 100)
gbm_cv.fit(X, y)
# pickle model
with open("gbmFit.pkl", "wb") as pickle_file:
    cPickle.dump(gbm_cv.best_estimator, pickle_file)
```

Note that, because custom class FeatureTrans former is included as part of our data pipeline, the custom class file FeatureTrans former.py should be included along with the actual pickled object gbmFit.pkl in an attachment.

Scoring New Records.

Once the GBR model is trained, scoring new data is simple:

```
Python import cPickle
import json
import numpy as np
import pandas as pd
from sklearn.ensemble import GradientBoostingRegressor
from sklearn.pipeline import Pipeline
from FeatureTransformer import FeatureTransformer
# load our trained model
with open('gbmFit.pkl', 'rb') as pickle_file:
    gbmFit = cPickle.load(pickle_file)
# each input record is delivered as a string
def score(record):
    datum = json.loads(record)
    score = list(gbmFit.predict(pd.DataFrame([datum]).replace("NA", np.nan)))[0]
    return json.dumps(score)
```

This model may be adapted essentially without modification for running in FastScore.

Loading the Model in FastScore.

Loading the GBR model (252) to FastScore may be broken into two steps: preparing the model code and creating the input and output streams.

Preparing the Model for FastScore.

In the previous section, a small Python script was created to score incoming auto records using the trained gradient boosting regressor and a custom feature transformer. In this example, the training of the model has already been done, so there is only a need to adapt the trained model to produce scores.

As discussed above, design rules for Python models in FastScore include delivering scores using an action method. Note that the action method operates as a generator, so scores are obtained from yield statements, rather than return statements. Additionally, because reloading the trained model with every score is inefficient, a begin method is defined to do all of the model initialization. Design rules include that if a model defines a begin method, this method will be called at the start of the job. After these alterations, the model abstraction binding (226) conforming to design rules for the analytic model abstraction (224) is:

```
score_auto_gbm.py fastscore.input gbm_input
fastscore.output gbm_output
import cPickle # unpickle a file
import imp # Load a custom class from the attachment
import numpy as np
import pandas as pd
from sklearn.ensemble import GradientBoostingRegressor
from sklearn.pipeline import Pipeline
# GBM model
def begin ( ):
    FeatureTransformer = imp.load_source('FeatureTransformer',
'FeatureTransformer.py')
    global gbmFit
    with open ("gbmFit.pkl", "rb") as pickle_file:
        gbmFit = cPickle.load(pickle file)
def action (datum):
    score = list(gbmFit.predict(pd.DataFrame( [datum] ).replace
("NA",
np.nan))) [0]
    yield score
```

To review the design rule changes made between this script, which is ready for scoring in FastScore, and the original one:

The input and output schemas have been specified in smart comments at the beginning of the model;

The score method has been renamed to action, and all JSON deserialization and serialization of the input and output records is taken care of automatically by FastScore;

The logic to load the pickled gbmFit object and any other initialization code is now put in a well-defined begin method, to be executed when the job starts; and With a custom class contained in the attachment, it is loaded using Python's imp module, as opposed to from FeatureTransformer import FeatureTransformer.

Input and Output Schemas.

FastScore may use AVRO schemas to enforce type and/or data science validation on model inputs and outputs. Both input/output streams, as well as the models themselves, should specify schemas.

The input schema for data may support complexity if the input records contain many fields.

```
gbm_input.avsc

{
    "type": "record",
    "name": "CarRecord",
    "fields": [
        {"name": "make", "type": "string"},
        {"name": "fuelType", "type": "string"},
        {"name": "aspiration", "type": "string"},
        {"name": "numDoors", "type": "string"},
        {"name": "bodyStyle", "type": "string"},
        {"name": "driveWheels", "type": "string"},
        {"name": "engineLocation", "type": "string"},
        {"name": "wheelBase", "type": "double"},
        {"name": "length", "type": "double"},
        {"name": "width", "type": "double"},
        {"name": "height", "type": "double"},
        {"name": "curbWeight", "type": "int"},
        {"name": "engineType", "type": "string"},
        {"name": "numCylinders", "type": "string"},
        {"name": "engineSize", "type": "int"},
        {"name": "fuelSystem", "type": "string"},
        {"name": "bore", "type": "double"},
        {"name": "stroke", "type": "double"},
        {"name": "compressionRatio", "type": "double"},
        {"name": "horsepower", "type": "int"},
        {"name": "peakRPM", "type": "int"},
        {"name": "cityMPG", "type": "int"},
        {"name": "highwayMPG", "type": "int"},
        {"name": "price", "type": "int"}
    ]
}
```

The output schema may be much simpler; the output of the model may just be a double between −3 and 3.
gbm_output.avsc
{"type":"double" }

Input and Output Descriptor Abstraction.

Another example feature of FastScore is that it enforces strong type contracts on model inputs and outputs: a model's inputs are guaranteed to match the specified input format, as are its outputs. The same may also be extended for data science constraints such as mean, standard deviation, and probably density function. The input and output streams are described using I/O descriptor abstractions. In this example, Kafka is used to both send and receive scores.

For the output stream, the I/O descriptor abstraction (232) may be simple:

```
gbm-out.json

{
    "Transport": {
        "Type": "kafka",
        "BootstrapServers": ["127.0.0.1:9092"],
        "Topic": "output"
    },
    "Envelope": null,
    "Encoding": "json",
    "Schema": {"$ref":"gbm_output"}
}
```

This I/O descriptor specifies that scores may be delivered on the "output" Kafka topic using the Kafka bootstrap server located at 127.0.0.01:9092, and that the scores delivered will be of AVRO type double, as specified in the output schema gbm_output.avsc.

The input stream descriptor includes the more complex schema, encapsulating the various features of the automobile input records. This schema is specified by reference, so that both the model abstraction (224) and the I/O descriptor abstraction (232) point to the same schema. In this way, if there are any changes to the schema, the model and stream descriptor will both use the new schema.

```
gbm-in.json

{
    "Transport": {
        "Type": "kafka",
        "BootstrapServers": ["127.0.0.1:9092"],
        "Topic": "input"
    },
    "Envelope": null,
    "Encoding": "json",
    "Schema": {"$ref":"gbm_output"}
}
```

Starting and Configuring FastScore. Starting up FastScore may be as easy as executing the following command:

docker-compose up -d

Once the FastScore containers are up and running, they may be configured via the CLI (288):

```
fastscore connect https://dashboard-host:8000
fastscore config set config.yml
``` where dashboard-host is the IP address of the Dashboard container (if you're running the Dashboard container in host networking mode on your local machine as in the Getting Started Guide, this will just be localhost).

After configuration, the containers may be monitored to see if they are healthy, for example in the CLI (288):

| fastscore fleet | | |
|---|---|---|
| Name | API | Health |
| engine-x-1 | engine-x | ok |
| model-manage-1 | model-manage | ok |

A note on Kafka: The instructions above assume a currently configured and running Kafka server set up with topics for the input and output streams, as well as the notify topic used by FastScore for asynchronous notifications. In the example, an additional docker-compose file, such as kafka-compose.yml, may automatically start up Kafka docker containers configured for this example. The Kafka services from this docker-compose file may for example be started with docker-compose -f kafka-compose.yml up -d before starting FastScore.

Adding Packages to FastScore. The model code written uses the pandas and sklearn Python packages, which need to be add to the FastScore Engine (222) container. The code also uses the numpy package, but this is installed in FastScore by default.

To add new packages to the engine container (222), there are two steps:

1) Install the package, for example, with pip; and

2) Add the package to the list of installed modules.

To install the packages needed, the commands pip install pandas and pip install sklearn should be executed in the engine container (222). For example, using docker-compose:

```
docker-compose exec engine-1 pip install pandas
docker-compose exec engine-1 pip install sklearn
```

Next, the novel packages that the model uses are added to FastScore's python.modules list. This list is used to check whether or not the current engine (222) possesses the required dependencies for a model before attempting to run the model (252) in the model runner (228). The python-.modules file is located inside of the engine container's file system at /root/engine/lib/engine-fs/priv/runners/python/python.modules To add the needed modules to the container via docker-compose, the following commands may be executed:

```
docker-compose exec engine-1 bash -c
'echo pandas >> /root/engine/lib/engine-
fs/priv/runners/python/python.modules'
docker-compose exec engine-1 bash -c
'echo sklearn.ensemble >>
/root/engine/lib/engine-fs/priv/runners/
python/python.modules'
docker-compose exec engine-1 bash -c
'echo sklearn.pipeline >>
/root/engine/lib/engine-fs/priv/runners/
python/python.modules'
```

If the container may be reused later, changes may be saved such that the packages do not need to be installed again in the future with the docker commit command:
docker commit [name of engine container] [name for new engine image]
After committing the new image, a docker-compose file may be updated to use the new image created.

Creating the Attachment.

In this section, it is assumed that the model file score_auto_gbm.py has been created, as well as the input and output stream descriptors gbm-in.json and gbm-out.json, and the pickled FeatureTransformer gbmFit.pkl and FeatureTransformer module FeatureTransformer.py.

Once these files have been created, they may be packaged along with the FeatureTransformer class and pickled object into a .zip or .tar.gz archive. This archive should contain:
FeatureTransformer.py
gbmFit.pkl The attachment may be called an arbitrary name here named gbm.tar.gz.

Adding the Model and Stream Descriptors.

Now that the model, stream descriptors, schemas, and attachment have been created, they may be added to Fast-Score. This may be done through the command line (288), or using Dashboard (290). From the command line (288) adding the schemas and stream descriptors may be accomplished with:

```
fastscore schema add gbm_input gbm_input.avsc
fastscore schema add gbm_output gbm_output.avsc
fastscore stream add GBM-in gbm-in.json
fastscore stream add GBM-out gbm-out.json
``` and adding the model and attachment may be accomplished with:

```
fastscore model add GBM score_auto_gbm.py
fastscore attachment upload GBM gbm.tar.gz
```

After adding the model, attachment, and streams to Fast-Score, they may be viewed from the FastScore Dashboard (290).

Delivering Scores Using Kafka.

The final step is to run the model, and deliver input records and output scores with Kafka. Kafka producers and consumers may be implemented in many languages. In the example code attached to this tutorial, a simple Scala Kafka client kafkaesq is used, which streams the contents of a file line-by-line over a specified input topic, and then prints any responses received on a specified output topic. In this example, FastScore is compatible with any implementation of Kafka producer/consumer.

After FastScore is configured, the system is ready to start scoring, which may be commenced from the CLI (288) with fastscore job run GBM GBM-in GBM-out Using an included Kafka client script, score a file may be accomplished with:
python kafkaesq --input-file/path/to/input/file.json input output At this point, the job may be stopped with fastscore job stop.

Figure 6:
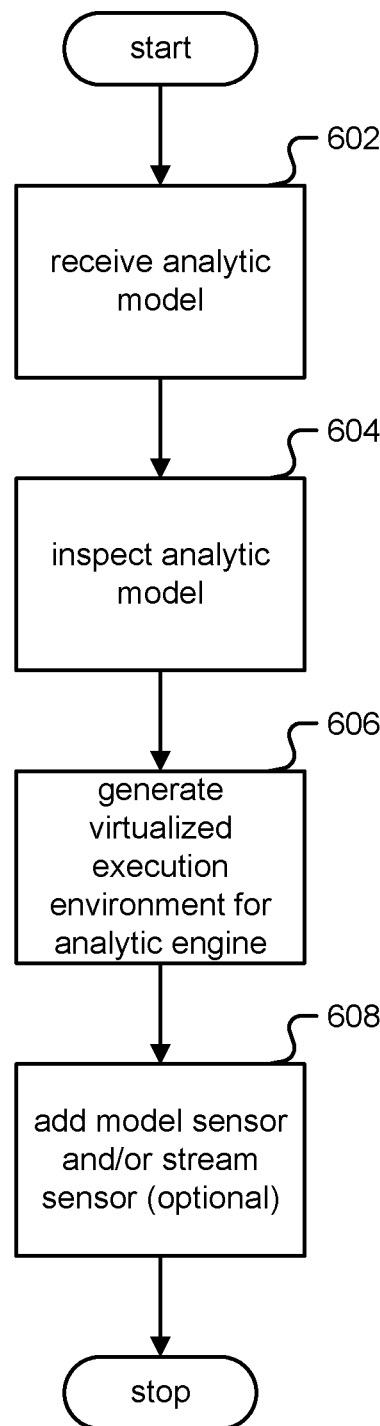
FIG. 6 is a flow chart illustrating an embodiment of a process for an analytic model execution.

FIG. 6 is a flow chart illustrating an embodiment of a process for an analytic model execution. In one embodiment, the process of FIG. 6 is carried out by the system of FIGS. 2A, 2B, 2C, 2D, 2E, and/or 2F.

In step 602, at an interface an analytic model (226) is received for processing data. In step 604, the analytic model is inspected to determine a language, an action, an input type, and an output type. For example, the analytic model (226) may be inspected to conform to an analytic model abstraction (224) before binding. In step 606, a VEE is generated for an analytic engine that includes executable code (228) to implement the analytic model for processing an input data stream. In optional step 608, a model and/or stream sensor (272) is added. In one embodiment, the sensor (272) is added to instrument the VEE for the analytic engine (222), wherein the sensor (272) provides metrics for monitoring, testing, statistically analyzing, and/or debugging a performance of the analytic model.

In one embodiment, the analytic model is implemented using a container (222) to provide the VEE for the analytic engine. In one embodiment, the container (222) is a portable and independently executable microservice.

In one embodiment, the analytic model includes an input configuration schema (232) that specifies an input type, an output configuration schema (232) that specifies an output type, and an I/O descriptor abstraction that specifies a stream type.

In one embodiment, the VEE for the analytic engine (222) includes a plurality of runtime engines (254, 256, 258, 260) that each support a distinct analytic model programming language.

In one embodiment, the interface for receiving the analytic model for processing data includes an API and/or SDK (286), a CLI (288), and/or a dashboard interface (290).

Figure 7:
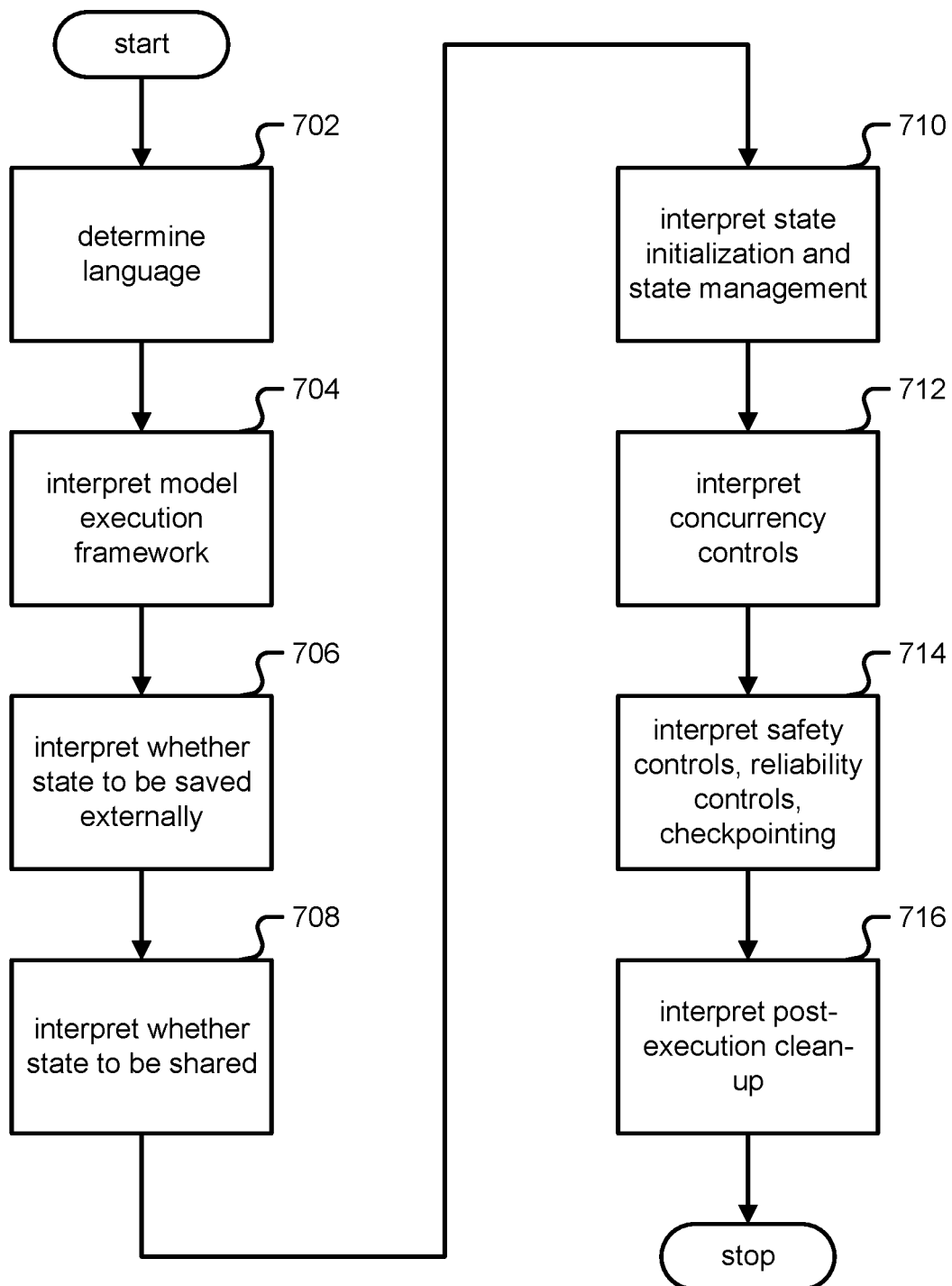
FIG. 7 is a flow chart illustrating an embodiment of a process for inspecting an analytic model (226).

FIG. 7 is a flow chart illustrating an embodiment of a process for inspecting an analytic model (226). In one embodiment, the flow of FIG. 7 is included in step 604 of FIG. 6.

In step 702, a language is determined from the analytic model, and may be one of the following: C, Python, Java, R, S, SAS, PFA, H2O, PMML, SPSS, Mathematica, Maple, and MATLAB. In one embodiment, the language is determined based on the file extension. In step 704, the analytic model is interpreted to determine code points for the beginning and end of model execution framework and/or for input and output of data, for example looking for a main( ) loop, for begin and end code snippets, and/or for action, emit and/or yield keywords, depending on the determined language in step 702.

In step 706, the analytic model is interpreted to determine whether state is to be saved externally, for example using snapshots as described above. In step 708, the analytic model is interpreted to determine whether state is to be shared, for example using cells and/or pools as described above. In step 710, the analytic model is interpreted to determine state initialization and state management. In step 712, the analytic model is interpreted to determine concurrency controls, for example for scaling and/or parallelization. In step 714, the analytic model is interpreted to determine safety controls, reliability controls, and/or checkpointing. In step 716, the analytic model is interpreted to determine post-execution clean-up.

Figure 8:
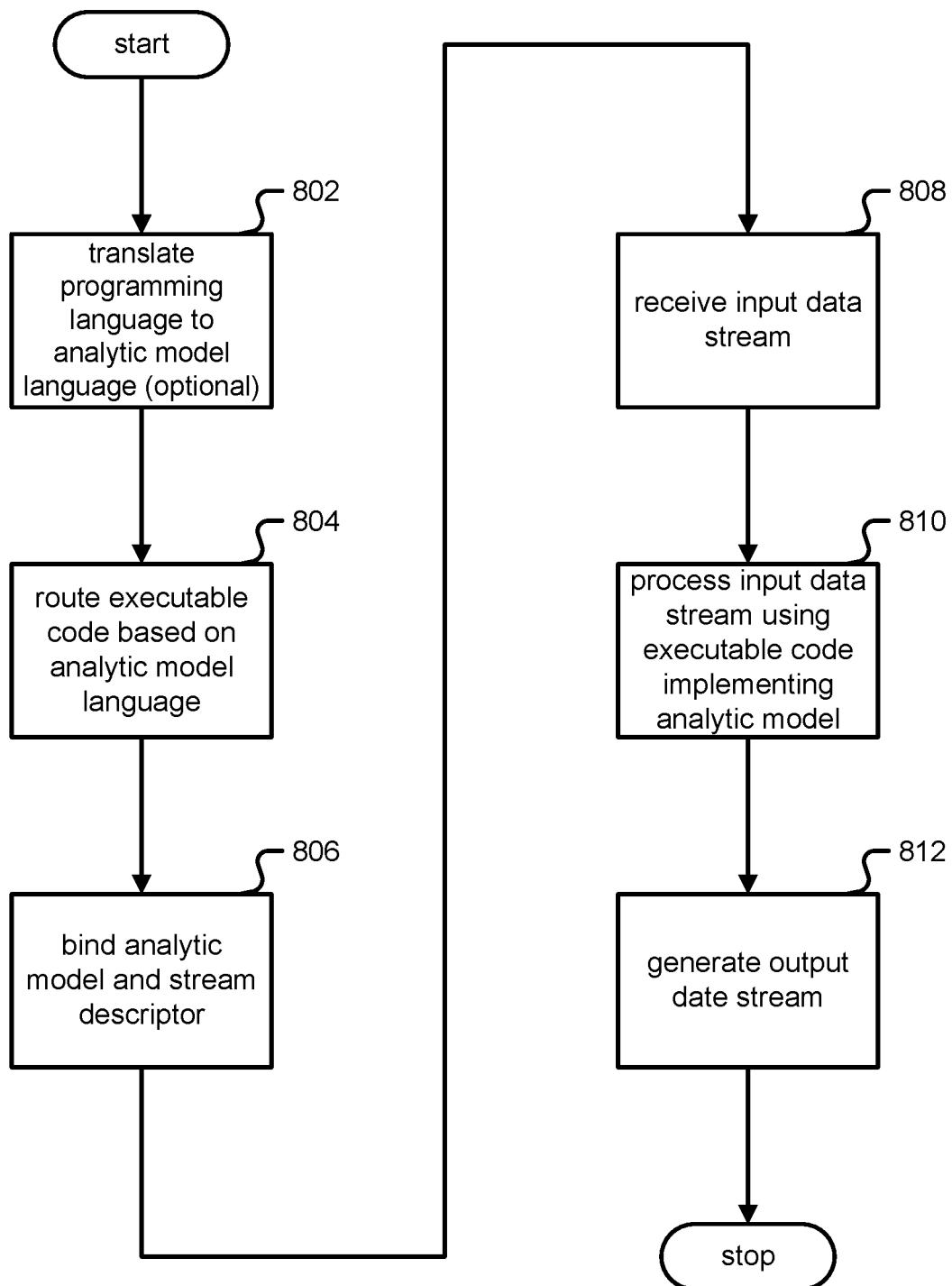
FIG. 8 is a flow chart illustrating an embodiment of a process for generating a virtualized execution environment (222) for an analytic model.

FIG. 8 is a flow chart illustrating an embodiment of a process for generating a virtualized execution environment (222) for an analytic model. In one embodiment, the flow of FIG. 8 is included in step 606 of FIG. 6.

In optional step 802, a first programming language, for example R, Python, Java, and/or C, of the analytic model (252) for processing data is translated to a first analytic model programming language, for example PFA and/or PPFA, to generate the executable code to implement the analytic model for processing the input data stream.

In step 804, the executable code (262, 264) is routed to implement the analytic model for processing the input data stream to one of the plurality of runtime engines (254, 256, 258, 260) based on the first analytic model language.

In step 806, an analytic model abstraction (224) and/or an I/O descriptor abstraction (232) go through a binding stage. For example, when an engine (222) binds an analytic model M1 (226, 252) with a I/O descriptor s1 based at least in part on the schema shared by M1 and s1. The engine (222) then binds M1 with a model runner (228) associated with the engine (222) and s with an input port (236). The engine (222) may check the input schema in M1 with that of s1 for conformity and flag an exception if they do not match.

In step 808, an input data stream is received at a stream processor (266). In step 810, the input data stream is processed using the executable code (262, 264) that implements the analytic model, wherein the stream processor (266) enforces the input type, for example that of I/O descriptor s1 in the example above. In step 812, an output data stream is generated using a stream processor (266) based on the output type, wherein the output data stream includes a score and/or a metric.

Figure 9:
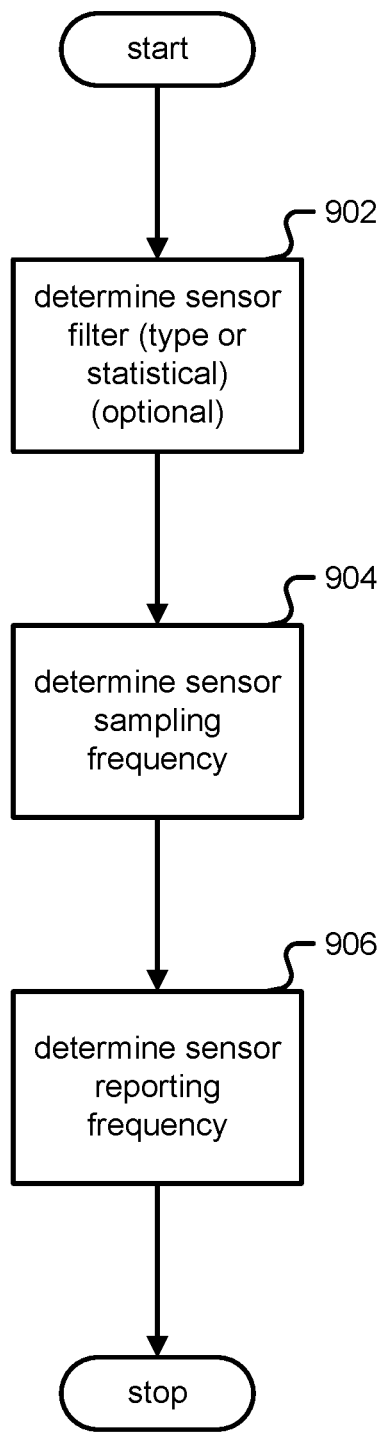
FIG. 9 is a flow chart illustrating an embodiment of a process for adding a model sensor and/or a stream sensor.

FIG. 9 is a flow chart illustrating an embodiment of a process for adding a model sensor and/or a stream sensor. In one embodiment, the flow of FIG. 9 is included in step 608 of FIG. 6.

As described above, sensors (272) are configurable functions that may be bound to either the model and/or a data stream and may be expressed for example in JSON. In step 902, it is determined what the sensor filter is, that is whether the sensor senses information related to datatype for example data bounds and/or ranges, and/or the sensor senses information related to statistical measures for example mean, median, standard deviation, variance, pdf, and/or cdf.

In step 904 a sensor sampling frequency is determined, for example sampling two times a second in the example above. In step 906, a sensor reporting frequency is determined, for example reporting every three seconds in the example above.

Figure 10:
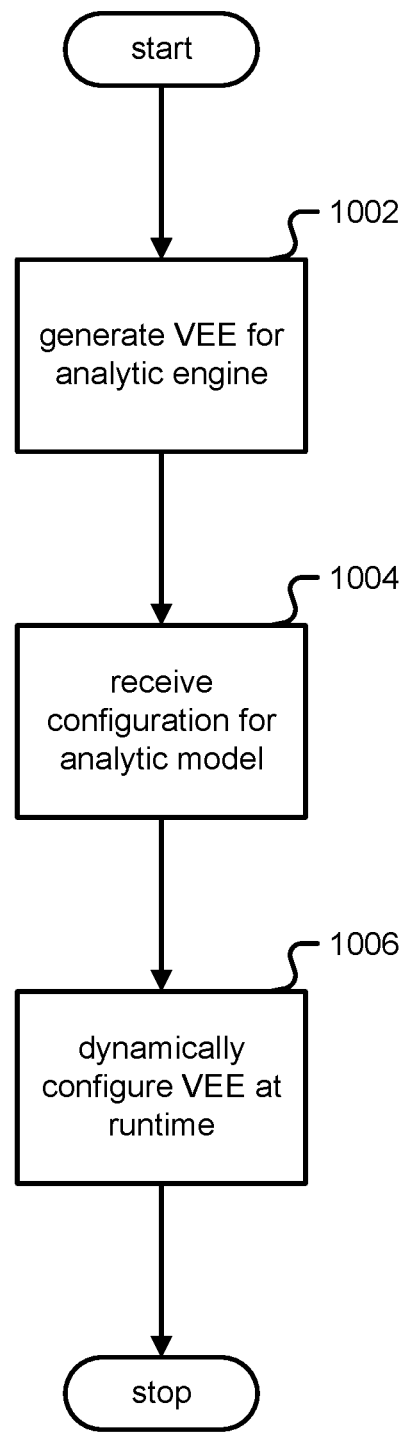
FIG. 10 is a flow chart illustrating an embodiment of a process for a dynamically configurable microservice model for data analysis.

FIG. 10 is a flow chart illustrating an embodiment of a process for a dynamically configurable microservice model for data analysis. In one embodiment, the process of FIG. 10 is carried out by the system of FIGS. 2A, 2B, 2C, 2D, 2E, and/or 2F.

In step 1002, a VEE is generated for an analytic engine that includes executable code to implement an analytic model for processing an input data stream. In one embodiment, the analytic model is implemented using a container to provide the VEE for the analytic engine, and the container is a portable and independently executable microservice, for example a web service with a RESTful API.

In step 1004, a configuration for the analytic model is received at an interface. In one embodiment, the interface for receiving includes an API and/or SDK (286), a CLI (288), and/or a dashboard interface (290). In one embodiment, the analytic model includes an input configuration schema that specifies an input type, an output configuration schema that specifies an output type, and a I/O descriptor abstraction that specifies a stream type.

In step 1006, the VEE for the analytic engine is dynamically configured at runtime based on the configuration for the analytic model. In one embodiment, the VEE for the analytic engine is dynamically configurable based upon receiving the configuration for the analytic model that includes an addition/modification/removal of the analytic model, the input configuration schema, the output configuration schema, and/or the stream configuration descriptor.

Figure 11:
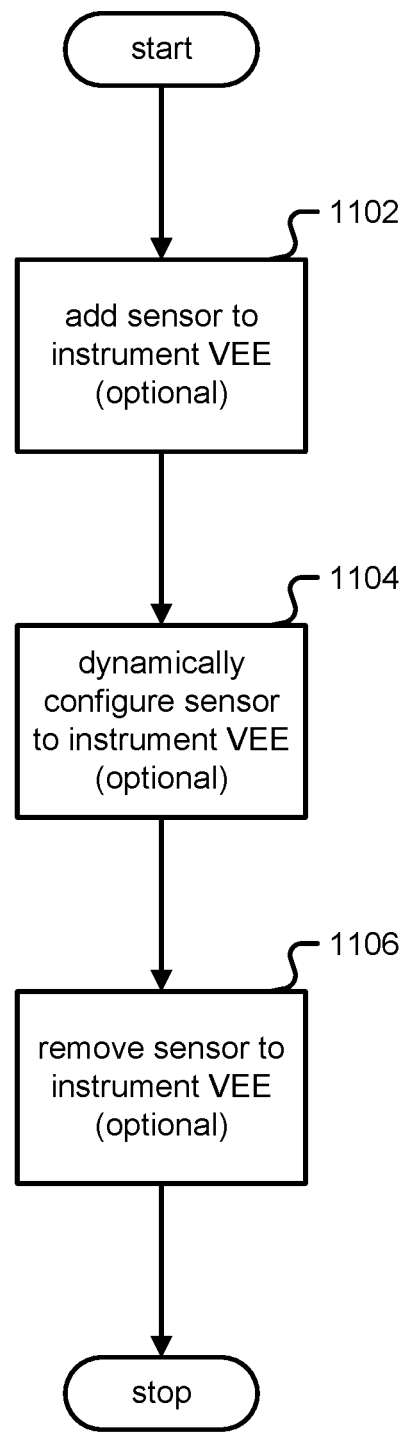
FIG. 11 is a flow chart illustrating an embodiment of a process for dynamic sensors (272).

FIG. 11 is a flow chart illustrating an embodiment of a process for dynamic sensors (272). In one embodiment, the process of FIG. 11 may be carried out by model (252) with sensors (272).

In optional step 1102, a sensor (272) is added dynamically, for example at run-time and/or debug-time. As described above, the added sensor may instrument the VEE for the analytic engine, wherein the sensor provides metrics for monitoring, testing, and/or debugging a performance of the analytic model.

In optional step 1104, the dynamic sensor (272) from step 1102 is also dynamically reconfigurable, for example at run-time and/or debug-time. An example of reconfiguring a dynamic sensor comprises changing a sensor parameter and/or changing a sensor threshold.

In optional step 1106, the dynamic sensor (272) from step 1102 is dynamically removable, for example at run-time and/or debug-time. Sensors may decrease performance and/or no longer be required for debugging once a bug is eradicated, and so removing the sensor may improve performance and/or efficiency.

Figure 12:
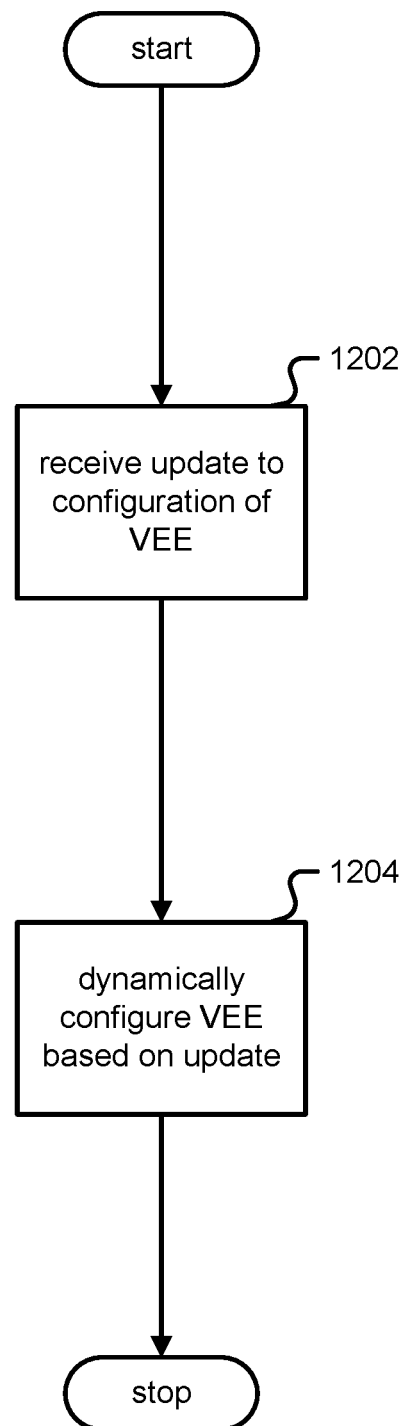
FIG. 12 is a flow chart illustrating an embodiment of a process for dynamic configuration of a VEE (222).

FIG. 12 is a flow chart illustrating an embodiment of a process for dynamic configuration of a VEE (222). In one embodiment, the process of FIG. 12 may be included in step 1006 of FIG. 10.

In step 1202, an update to a configuration of the VEE is received. An example of an update to configuration includes: changing an included library, a modification to a cloud execution environment, and/or other changes to the (222) engine and/or model environment.

In step 1204, the VEE for the analytic engine may be dynamically reconfigured based on the update to the configuration of the VEE, for example at run-time and/or debug-time.

Figure 13:
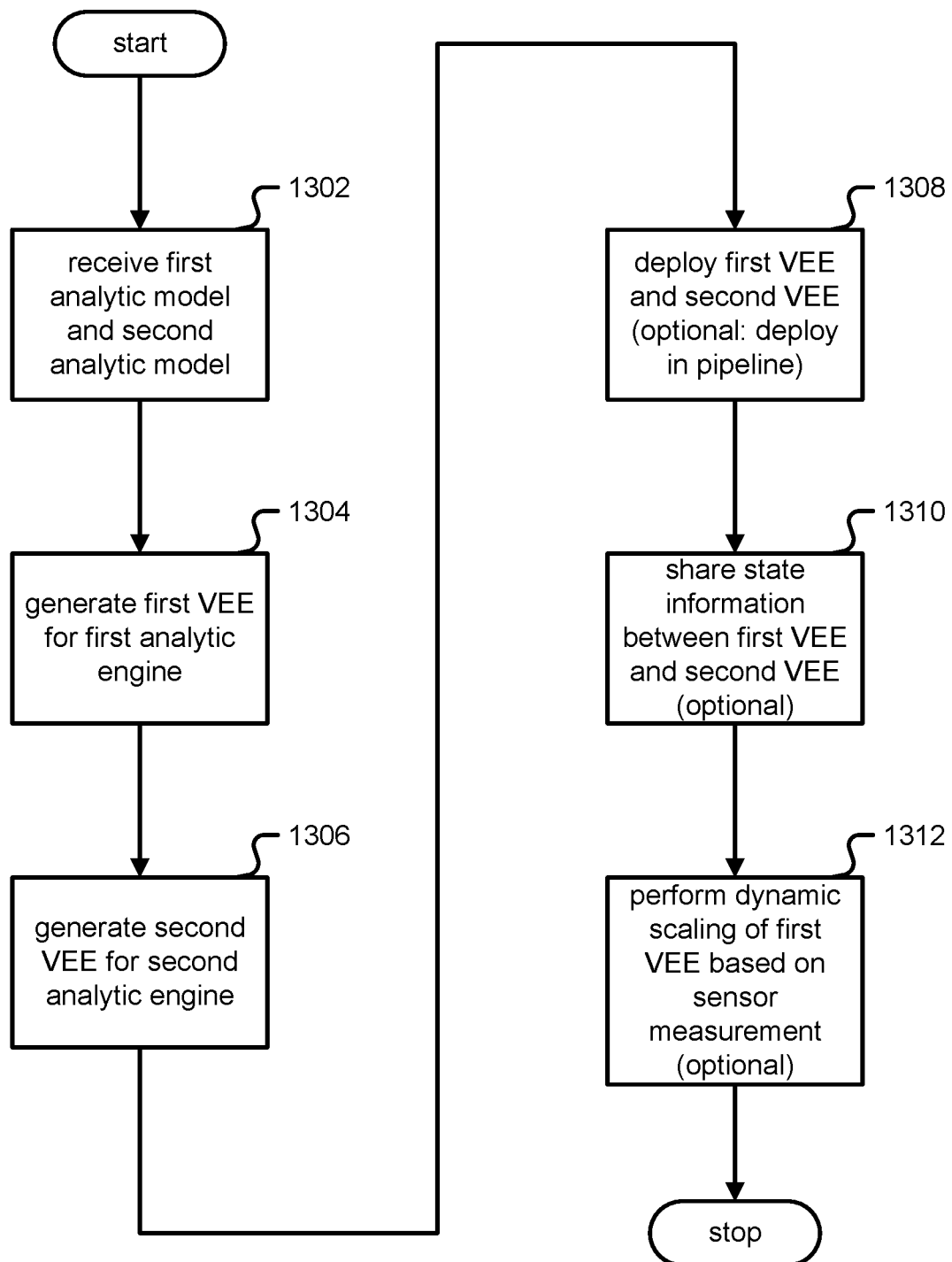
FIG. 13 is a flow chart illustrating an embodiment of a process for deployment and management of model execution engines.

FIG. 13 is a flow chart illustrating an embodiment of a process for deployment and management of model execution engines. In one embodiment, the process of FIG. 13 is carried out by the system of FIGS. 2A, 2B, 2C, 2D, 2E, and/or 2F.

In step 1302, a first analytic model for processing data and a second analytic model for processing data are received at an interface. In one embodiment, the interface includes an API and/or SDK (286), a CLI (288), and/or a dashboard interface (290).

In step 1304, a first VEE is generated for a first analytic engine that includes executable code to implement the first analytic model for processing a first input data stream. In step 1306, a second VEE is generated for a second analytic engine that includes executable code to implement the second analytic model for processing a second input data stream.

In one embodiment, the first analytic model is implemented using a first container (202, 222) to provide the first virtualized execution environment for the first analytic engine, wherein the second analytic model is implemented using a second container (216, 222) to provide the second virtualized execution environment for the second analytic engine, and wherein the first container and the second container are each dynamically scalable. In one embodiment, the first and second analytic models are stored using a Model Manager (210). In one embodiment, the first container (202, 222) and the second container (216, 222) are each a portable and independently executable microservice.

In step 1308, the first VEE for the first analytic engine and the second VEE for the second analytic engine are deployed. For example, they may be deployed using a fleet controller (212). In one embodiment, they may be deployed in a pipeline as shown in FIGS. 2A, and/or FIG. 3 as an example.

In one embodiment, deployment of the first VEE for the first analytic engine and the second VEE for the second analytic engine in a pipeline comprises cloud complex analytic workflows that may be cloud portable, multi-cloud, hybrid cloud, system portable, and/or language neutral.

In optional step 1310, state information is shared between the first VEE and second VEE. In one embodiment, state information is shared between the first VEE for the first analytic engine and the second VEE for the second analytic engine, wherein the first virtualized execution environment for the first analytic engine and the second virtualized execution environment for the second analytic engine are executed concurrently or sequentially.

In optional step 1312, dynamic scaling of a VEE is performed based on sensor measurement. For example, the first VEE for the first analytic engine (202, 222) may implement a concurrency model, wherein the first VEE for the first analytic engine (202, 222) includes a sensor for instrumenting the first VEE for the first analytic engine. Then, dynamic scaling of the first VEE is performed for the first analytic engine (202, 222) based on the concurrency model and a measurement detected using the sensor, for example to deploy additional containers for the first analytic engine to be executed in parallel, as described above for an R model that may be made more efficient through parallelization.

Figure 14:
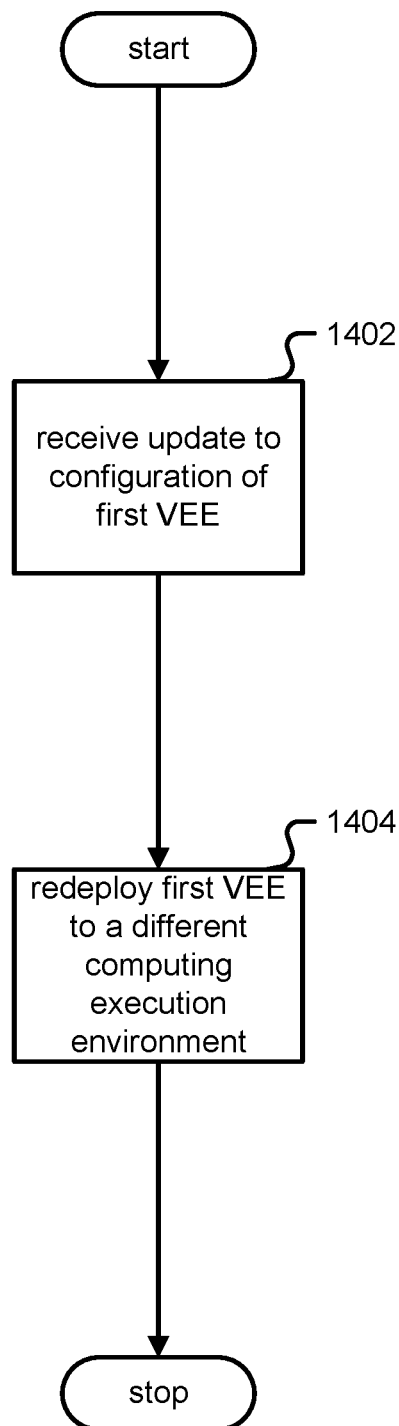
FIG. 14 is a flow chart illustrating an embodiment of a process for redeployment of model execution engines.

FIG. 14 is a flow chart illustrating an embodiment of a process for redeployment of model execution engines. In one embodiment, the process of FIG. 14 is carried out by the system of FIGS. 2A, 2B, 2C, 2D, 2E, and/or 2F.

In step 1402, an update to a configuration of the first VEE for the first analytic engine (202, 222) is received. An example of an update would be a change to a cloud execution environment.

In step 1404, the first VEE for the first analytic engine (202, 222) is dynamically redeployed to a different computing execution environment at, for example, run-time and/or debug-time. For example if the update is a change to the cloud execution environment, then the engine (202) may be redeployed from off-premises to a cloud, an enterprise data center, and/or a hybrid cloud.

Further examples of redeployment would be dynamically redeploying engine (202) from Azure to AWS or Google Cloud, moving a subset of engines within a pipeline from Azure to AWS or Google. This redeployment may be based on which environment has available GPU support as based on sensors while testing/executing in Azure, as described in FIG. 3.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
generate a virtualized execution environment for an analytic engine that includes executable code to implement an analytic model for processing an input data stream;
receive at an interface a configuration for the analytic model;
inspect the analytic model to identify a programming language associated with the analytic model, to identify an action, an input type, and an output type associated with the analytic model, and to verify conformity of the analytic model with a plurality of model abstraction design rules that include specifying a distinct schema for each input and each output to the analytic model, wherein the analytic model is bound to the input data stream and an output data stream, and wherein the analytic model consumes data received in the input data stream;
dynamically configure the virtualized execution environment for the analytic engine at runtime based on the configuration for the analytic model, wherein the virtualized execution environment is implemented using a container, and the container is a portable and independently executable microservice; and
dynamically add a sensor at runtime and/or debug-time to instrument the virtualized execution environment for the analytic engine for the microservice, wherein the sensor provides metrics for monitoring, testing, statistically analyzing, and/or debugging a performance of the analytic model, wherein the sensor is dynamically configurable at runtime and/or debug-time for changing a sensor parameter and/or changing a sensor threshold; and
a memory coupled to the processor and configured to provide the processor with instructions.

2. The system recited in claim 1, wherein the analytic model is implemented using the container to provide the virtualized execution environment for the analytic engine, and wherein the container is dynamically configurable.

3. The system recited in claim 1, wherein the analytic model includes an input configuration schema that specifies an input type, an output configuration schema that specifies an output type, and a I/O descriptor abstraction that specifies a stream type, and wherein the virtualized execution environment for the analytic engine is dynamically configurable based upon receiving the configuration for the analytic model that includes an update to the analytic model, the input configuration schema, the output configuration schema, and/or the stream configuration descriptor.

4. The system recited in claim 1, wherein the virtualized execution environment for the analytic engine includes a plurality of runtime engines that each supports a distinct analytic model programming language.

5. The system recited in claim 1, wherein the interface for receiving the configuration for the analytic model includes an Application Programming Interface (API), a Command Line Interface (CLI), and/or a dashboard interface.

6. The system recited in claim 1, wherein the processor is further configured to:
remove the sensor to instrument the virtualized execution environment for the analytic engine, wherein the sensor provides metrics for monitoring, testing, and/or debugging a performance of the analytic model.

7. The system recited in claim 1, wherein the processor is further configured to:
dynamically configure the sensor to instrument the virtualized execution environment for the analytic engine, wherein the sensor provides metrics for monitoring, testing, and/or debugging a performance of the analytic model.

8. The system recited in claim 1, wherein the processor is further configured to:
receive an update to the configuration of the virtualized execution environment; and
dynamically configure the virtualized execution environment for the analytic engine at runtime based on the update to the configuration of the virtualized execution environment.

9. The system recited in claim 1, wherein the sensor includes a code point associated with a model runner, an input port, an output port, a sampling frequency, and/or a reporting frequency of the analytic engine.

10. The system recited in claim 1, wherein the sensor is dynamically added at runtime and/or debug-time using an application programming interface (API), and wherein the sensor is dynamically configurable at runtime and/or debug-time for changing a sensor parameter and/or changing a sensor threshold via the API.

11. The system recited in claim 1, wherein specifying the distinct schema for each input and each output to the analytic model includes an input configuration schema that specifies an input type, an output configuration schema that specifies an output type, and a stream configuration descriptor that specifies a stream type, and wherein the virtualized execution environment is bound to the analytic model and a stream descriptor based on a schema shared by the analytic model and the stream descriptor.

12. A method, comprising:
generating a virtualized execution environment for an analytic engine that includes executable code to implement an analytic model for processing an input data stream;
receiving at an interface a configuration for the analytic model;
inspecting the analytic model to identify a programming language associated with the analytic model, to identify an action, an input type, and an output type associated with the analytic model, and to verify conformity of the analytic model with a plurality of model abstraction design rules that include specifying a distinct schema for each input and each output to the analytic model, wherein the analytic model is bound to the input data stream and an output data stream, and wherein the analytic model consumes data received in the input data stream;
dynamically configuring the virtualized execution environment for the analytic engine at runtime based on the configuration for the analytic model, wherein the virtualized execution environment is implemented using a container, and the container is a portable and independently executable microservice; and
dynamically add a sensor at runtime and/or debug-time to instrument the virtualized execution environment for the analytic engine for the microservice, wherein the sensor provides metrics for monitoring, testing, statistically analyzing, and/or debugging a performance of the analytic model, wherein the sensor is dynamically configurable at runtime and/or debug-time for changing a sensor parameter and/or changing a sensor threshold.

13. The method of claim 12, wherein the analytic model is implemented using the container to provide the virtualized execution environment for the analytic engine, and wherein the container is dynamically configurable.

14. The method of claim 12, wherein the analytic model includes an input configuration schema that specifies an input type, an output configuration schema that specifies an output type, and a stream configuration descriptor that specifies a stream type, and wherein the virtualized execution environment for the analytic engine is dynamically configurable based upon receiving the configuration for the analytic model that includes an update to the analytic model, the input configuration schema, the output configuration schema, and/or the stream configuration descriptor.

15. The method of claim 12, wherein the virtualized execution environment for the analytic engine includes a plurality of runtime engines that each supports a distinct analytic model language.

16. The method of claim 12, wherein the sensor includes a code point associated with a model runner, an input port, an output port, a sampling frequency, and/or a reporting frequency of the analytic engine.

17. A computer program product, the computer program product being embodied in a non-transitory, tangible computer readable storage medium and comprising computer instructions for:
generating a virtualized execution environment for an analytic engine that includes executable code to implement an analytic model for processing an input data stream;
receiving at an interface a configuration for the analytic model;
inspecting the analytic model to identify a programming language associated with the analytic model, to identify an action, an input type, and an output type associated with the analytic model, and to verify conformity of the analytic model with a plurality of model abstraction design rules that include specifying a distinct schema for each input and each output to the analytic model, wherein the analytic model is bound to the input data stream and an output data stream, and wherein the analytic model consumes data received in the input data stream;
dynamically configuring the virtualized execution environment for the analytic engine at runtime based on the configuration for the analytic model, wherein the virtualized execution environment is implemented using a container, and the container is a portable and independently executable microservice; and
dynamically add a sensor at runtime and/or debug-time to instrument the virtualized execution environment for the analytic engine for the microservice, wherein the sensor provides metrics for monitoring, testing, statistically analyzing, and/or debugging a performance of the analytic model, wherein the sensor is dynamically configurable at runtime and/or debug-time for changing a sensor parameter and/or changing a sensor threshold.

18. The computer program product recited in claim 17, wherein the analytic model is implemented using the container to provide the virtualized execution environment for the analytic engine, and wherein the container is dynamically configurable.

19. The computer program product recited in claim 17, wherein the analytic model includes an input configuration schema that specifies an input type, an output configuration schema that specifies an output type, and a stream configuration descriptor that specifies a stream type, and wherein the virtualized execution environment for the analytic engine is dynamically configurable based upon receiving the configuration for the analytic model that includes an update to the analytic model, the input configuration schema, the output configuration schema, and/or the stream configuration descriptor.

20. The computer program product recited in claim 17, wherein the virtualized execution environment for the analytic engine includes a plurality of runtime engines that each supports a distinct analytic model language.

21. The computer program product recited in claim 17, wherein the sensor includes a code point associated with a model runner, an input port, an output port, a sampling frequency, and/or a reporting frequency of the analytic engine.

* * * * *